US010051598B2

(12) United States Patent
Tawara et al.

(10) Patent No.: US 10,051,598 B2
(45) Date of Patent: Aug. 14, 2018

(54) INFORMATION PROCESSING APPARATUS, INFORMATION PROCESSING METHOD, TARGET TERMINAL, COMMUNICATION METHOD, AND PROGRAM

(71) Applicant: SONY CORPORATION, Tokyo (JP)

(72) Inventors: Tetsuo Tawara, Tokyo (JP); Atsushi Shionozaki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 35 days.

(21) Appl. No.: 15/104,390

(22) PCT Filed: Sep. 22, 2014

(86) PCT No.: PCT/JP2014/075093
§ 371 (c)(1),
(2) Date: Jun. 14, 2016

(87) PCT Pub. No.: WO2015/098213
PCT Pub. Date: Jul. 2, 2015

(65) Prior Publication Data
US 2016/0316448 A1    Oct. 27, 2016

(30) Foreign Application Priority Data

Dec. 26, 2013 (JP) .................................. 2013-269920

(51) Int. Cl.
*H04W 64/00* (2009.01)
*G01S 5/02* (2010.01)
*H04M 3/42* (2006.01)
(Continued)

(52) U.S. Cl.
CPC ............ *H04W 64/006* (2013.01); *G01S 5/02* (2013.01); *H04L 61/103* (2013.01); *H04M 3/42* (2013.01);
(Continued)

(58) Field of Classification Search
CPC ..... H04W 64/006; H04W 64/00; H04W 4/02; H04W 8/26; H04W 12/02; H04L 61/103; H04M 3/42; G01S 5/02
See application file for complete search history.

(56) References Cited

U.S. PATENT DOCUMENTS 8,792,906 B2 * 7/2014 Batada ................. H04W 4/008
455/426.1
2005/0090268 A1 * 4/2005 Yamasaki ............. H04W 64/00
455/456.5
(Continued)

FOREIGN PATENT DOCUMENTS

JP     2004-350088 A    12/2004
JP     2006-011833 A     1/2006
(Continued)

*Primary Examiner* — Marcos Torres
(74) *Attorney, Agent, or Firm* — Oblon, McClelland, Maier & Neustadt, L.L.P.

(57) ABSTRACT

[Object] To provide a technique which is capable of reducing the possibility that information related to the user of a target terminal may be acquired by others.
[Solution] There is provided an information processing apparatus including an identification information acquisition unit configured to acquire predetermined identification information associated with an IP address of a target terminal, from the target terminal, a data acquisition unit configured to acquire a MAC address of the target terminal associated with the IP address of the target terminal, from a control apparatus for a base station to which the target terminal is connected, a storage control unit configured to store the predetermined identification information and the MAC address of the target terminal in association with each other, and a position information provision unit configured to, when acquiring a position estimation request including the predetermined identification information from the target terminal, provide position information of the target terminal
(Continued)

corresponding to the MAC address of the target terminal associated with the predetermined identification information, to the target terminal.

10 Claims, 14 Drawing Sheets

(51) Int. Cl.
*H04W 4/02* (2018.01)
*H04W 8/26* (2009.01)
*H04L 29/12* (2006.01)
*H04W 12/02* (2009.01)

(52) U.S. Cl.
CPC .............. *H04W 4/02* (2013.01); *H04W 8/26* (2013.01); *H04W 12/02* (2013.01); *H04W 64/00* (2013.01)

(56) References Cited

U.S. PATENT DOCUMENTS

| | | | |
|---|---|---|---|
| 2005/0221842 A1* | 10/2005 | Kaneko | H04W 60/04 455/456.6 |
| 2012/0304578 A1 | 12/2012 | Williams | |
| 2013/0304578 A1 | 11/2013 | Kannan et al. | |
| 2015/0005002 A1* | 1/2015 | Boulay | G01S 5/0072 455/456.1 |

FOREIGN PATENT DOCUMENTS

| | | |
|---|---|---|
| JP | 2008-104029 A | 5/2008 |
| JP | 2012-191263 A | 10/2012 |

* cited by examiner

INFORMATION PROCESSING APPARATUS, INFORMATION PROCESSING METHOD, TARGET TERMINAL, COMMUNICATION METHOD, AND PROGRAM

CROSS REFERENCE TO RELATED APPLICATIONS

This application is a U.S. National Phase of International Patent Application No. PCT/JP2014/075093 filed on Sep. 22, 2014, which claims priority benefit of Japanese Patent Application No. JP 2013-269920 filed in the Japan Patent Office on Dec. 26, 2013. Each of the above-referenced applications is hereby incorporated herein by reference in its entirety.

TECHNICAL FIELD

The present disclosure relates to information processing apparatuses, information processing methods, target terminals, communication methods, and programs.

BACKGROUND ART

A technique for enabling a target terminal to, when receiving a radio signal transmitted from a base station, estimate the position information of the target terminal on the basis of the position information of the base station (see, for example, Patent Literature 1). In such a technique, when the target terminal transmits the media access control (MAC) address of the base station included in the received radio signal to a position estimation device, the position estimation device identifies the position information of the base station from the MAC address of the base station, and estimates the position information of the target terminal on the basis of the position information of the base station.

Also, there is a technique for enabling a base station around a target terminal to, when receiving a radio signal transmitted from the target terminal, estimate the position information of the target terminal on the basis of the position information of the surrounding base station. In such a technique, when the target terminal transmits a radio signal including its own MAC address to the surroundings, the surrounding base station, which has received the MAC address, transmits the MAC address of the target terminal to a position estimation device. The position estimation device estimates the position information of the target terminal on the basis of the position information of the surrounding base station, which has received the MAC address of the target terminal.

The position information of target terminals is typically estimated by the position estimation device for each of the MAC addresses of the target terminals.

CITATION LIST

Patent Literature

Patent Literature 1: JP 2008-104029A

SUMMARY OF INVENTION

Technical Problem

However, if a position estimation request including the MAC address of a target terminal is transmitted to the surroundings, there is a risk that information related to the user of the target terminal may be acquired by others, leading to a violation of the user's privacy. Therefore, it is desirable that a technique capable of reducing the possibility that information related to the user of a target terminal may be acquired by others should be achieved.

Solution to Problem

According to the present disclosure, there is provided an information processing apparatus including: an identification information acquisition unit configured to acquire predetermined identification information associated with an IP address of a target terminal, from the target terminal; a data acquisition unit configured to acquire a MAC address of the target terminal associated with the IP address of the target terminal, from a control apparatus for a base station to which the target terminal is connected; a storage control unit configured to store the predetermined identification information and the MAC address of the target terminal in association with each other; and a position information provision unit configured to, when acquiring a position estimation request including the predetermined identification information from the target terminal, provide position information of the target terminal corresponding to the MAC address of the target terminal associated with the predetermined identification information, to the target terminal.

According to the present disclosure, there is provided an information processing method including: acquiring predetermined identification information associated with an IP address of a target terminal, from the target terminal; acquiring a MAC address of the target terminal associated with the IP address of the target terminal, from a control apparatus for a base station to which the target terminal is connected; storing the predetermined identification information and the MAC address of the target terminal in association with each other; and providing, when a position estimation request including the predetermined identification information is acquired from the target terminal, position information of the target terminal corresponding to the MAC address of the target terminal associated with the predetermined identification information, to the target terminal.

According to the present disclosure, there is provided a program for causing a computer to function as an information processing apparatus including an identification information acquisition unit configured to acquire predetermined identification information associated with an IP address of a target terminal, from the target terminal, a data acquisition unit configured to acquire a MAC address of the target terminal associated with the IP address of the target terminal, from a control apparatus for a base station to which the target terminal is connected, a storage control unit configured to store the predetermined identification information and the MAC address of the target terminal in association with each other, and a position information provision unit configured to, when acquiring a position estimation request including the predetermined identification information from the target terminal, provide position information of the target terminal corresponding to the MAC address of the target terminal associated with the predetermined identification information, to the target terminal.

According to the present disclosure, there is provided a target terminal including: an identification information provision unit configured to provide predetermined identification information associated with an IP address of the target terminal, to an information processing apparatus; and a position information acquisition unit configured to, when the information processing apparatus acquires a MAC address of the target terminal associated with the IP address of the target terminal from a control apparatus for a base station to which the target terminal is connected, and the predetermined identification information and the MAC address of the target terminal are associated with each other, provide a position estimation request including the predetermined identification information to the information processing apparatus, and acquire position information of the target terminal corresponding to the MAC address of the target terminal associated with the predetermined identification information, from the information processing apparatus.

According to the present disclosure, there is provided a communication method including: providing predetermined identification information associated with an IP address of a target terminal, to an information processing apparatus; and when the information processing apparatus acquires a MAC address of the target terminal associated with the IP address of the target terminal from a control apparatus for a base station to which the target terminal is connected, and the predetermined identification information and the MAC address of the target terminal are associated with each other, providing a position estimation request including the predetermined identification information to the information processing apparatus, and acquiring position information of the target terminal corresponding to the MAC address of the target terminal associated with the predetermined identification information, from the information processing apparatus.

According to the present disclosure, there is provided a program for causing a computer to function as a target terminal including an identification information provision unit configured to provide predetermined identification information associated with an IP address of the target terminal, to an information processing apparatus, and a position information acquisition unit configured to, when the information processing apparatus acquires a MAC address of the target terminal associated with the IP address of the target terminal from a control apparatus for a base station to which the target terminal is connected, and the predetermined identification information and the MAC address of the target terminal are associated with each other, provide a position estimation request including the predetermined identification information to the information processing apparatus, and acquire position information of the target terminal corresponding to the MAC address of the target terminal associated with the predetermined identification information, from the information processing apparatus.

Advantageous Effects of Invention

As described above, according to the present disclosure, the possibility that information related to the user of a target terminal may be acquired by others can be reduced. Note that the above advantages are not necessarily limiting. In addition to or instead of the above advantages, any of advantages described hereinafter or other advantages that will be understood from the following description, may be achieved.

DESCRIPTION OF EMBODIMENTS

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

Note that, in this description and the drawings, structural elements that have substantially the same function and structure are sometimes distinguished from each other using different alphabets after the same reference sign. However, when there is no need in particular to distinguish structural elements that have substantially the same function and structure, the same reference sign alone is attached.

Also, the "embodiments for carrying out the present invention" will be described in the following order of section.

1. First embodiment
 1-1. Configuration example of information processing system
 1-2. Functional configuration example of target terminal
 1-3. Functional configuration example of information processing apparatus
 1-4. Details of functions of information processing system
 1-5. Operation example of information processing system
2. Second embodiment
 2-1. Details of functions of information processing system
 2-2. Operation example of information processing system
3. Hardware configuration example
4. Conclusion

1. First Embodiment

Firstly, a first embodiment of the present disclosure will be described.

1-1. Configuration Example of Information Processing System

Figure 1:
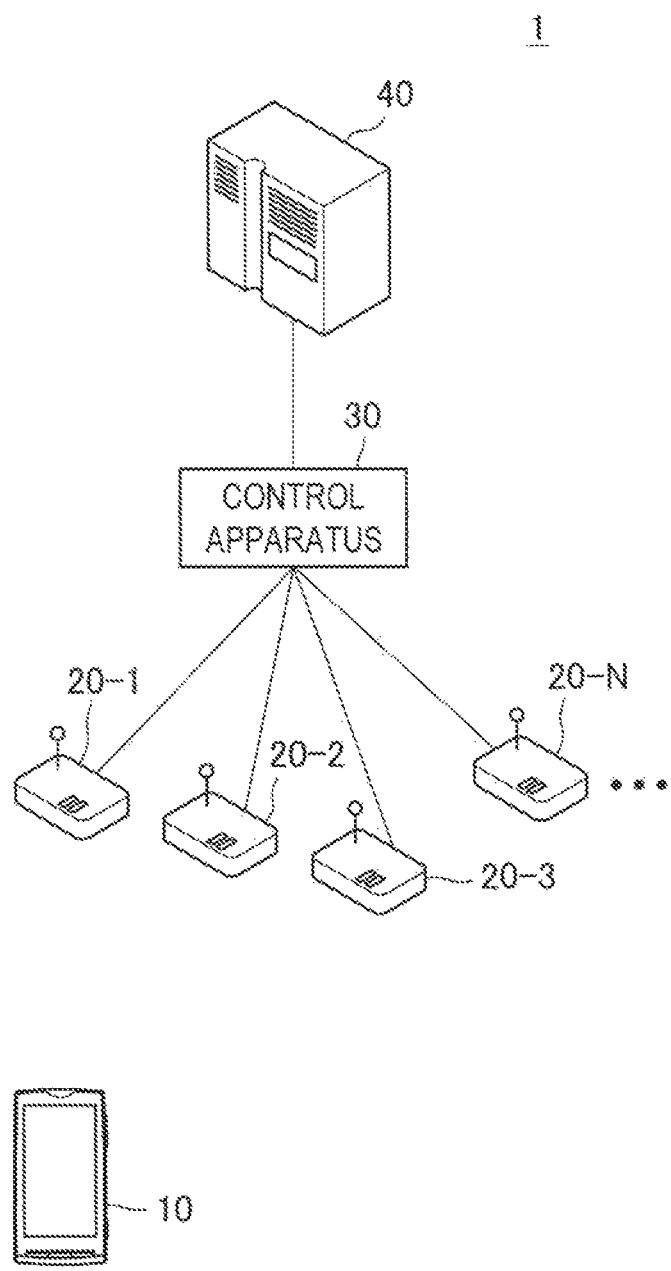
FIG. 1 is a diagram showing a configuration example of an information processing system according to a first embodiment of the present disclosure.

Firstly, a configuration example of the information processing system 1 according to the first embodiment of the present disclosure will be described. FIG. 1 is a diagram showing the configuration example of the information processing system 1 according to the first embodiment of the present disclosure. As shown in FIG. 1, the information processing system 1 includes target terminals 10, base stations 20-1-20-N (N is a natural number), a control apparatus 30, and an information processing apparatus 40.

The target terminal 10 is a terminal that is operated by the user. In the description that follows, a case where the target terminal 10 is applied to a smartphone will be described as an example. Alternatively, the target terminal 10 may be applied to other apparatuses in addition to smartphones. For example, the target terminal 10 may be applied to a video camera, digital camera, personal digital assistant (PDA), personal computer (PC), mobile telephone, portable music playback device, portable video processing device, handheld game console, and the like.

The base station 20 relays communication between communication apparatuses. For example, the base station 20 can relay wireless communication that is performed by a target terminal 10 which is located within a range where radio waves can reach, and relay communication between the target terminal 10 and a communication apparatus connected to the base station 20 by a wire. Specifically, the base station 20 may be an access point for a wireless local area network (LAN). Although, in the example shown in FIG. 1, the information processing system 1 has the N base stations 20, the number of the base stations 20 is not particularly limited.

The base station 20 can also regularly transmit a beacon signal for reporting the presence of the base station 20 to the surroundings. The beacon signal may include, for example, a base station identifier uniquely assigned to the base station 20. As a result, a target terminal 10 can confirm the presence of a surrounding base station 20 that has transmitted the beacon signal received by that target terminal 10, on the basis of the identifier of that base station. The identifier of the base station 20 may, for example, be the media access control (MAC) address of the base station 20.

The control apparatus 30 has the function of controlling the base stations 20-1-20-N, which are under the control of the control apparatus 30. The control apparatus 30 may be a wireless LAN (WLAN) controller, WLAN switch, or the like. For example, the control apparatus 30 may manage settings such as frequency channels used by the base stations 20-1-20-N and the like in a centralized manner, or monitor the communication statuses of the base stations 20-1-20-N to control load distribution or handover for target terminals 10. The control apparatus 30 stores information related to target terminals 10 connected to the base stations 20-1-20-N (e.g., the IP addresses of the target terminals 10, the MAC addresses of the target terminals 10, etc.).

The information processing apparatus 40 can perform information processing according to a request from a target terminal 10, and sends a processing result as a response to the target terminal 10. For example, the information processing apparatus 40, when acquiring a position estimation request from a target terminal 10, can provide the position of the target terminal 10, as a response to the position estimation request, to the target terminal 10. Although, in the example shown in FIG. 1, all the functions possessed by the information processing apparatus 40 are integrated together, some (e.g., a position information provision unit 415) of the functions possessed by the information processing apparatus 40 may be separated from the others.

Here, the position information of target terminals 10 is typically estimated by the information processing apparatus 40 for each of the MAC addresses of the target terminals 10. However, if a position estimation request including the MAC address of a target terminal 10 is transmitted to the surroundings, there is a risk that information related to the user of the target terminal 10 may be acquired by others, leading to a violation of the user's privacy. With this in mind, a technique is herein proposed which is capable of reducing the possibility that information related to the user of a target terminal 10 may be acquired by others.

1-2. Functional Configuration Example of Target Terminal

Figure 2:
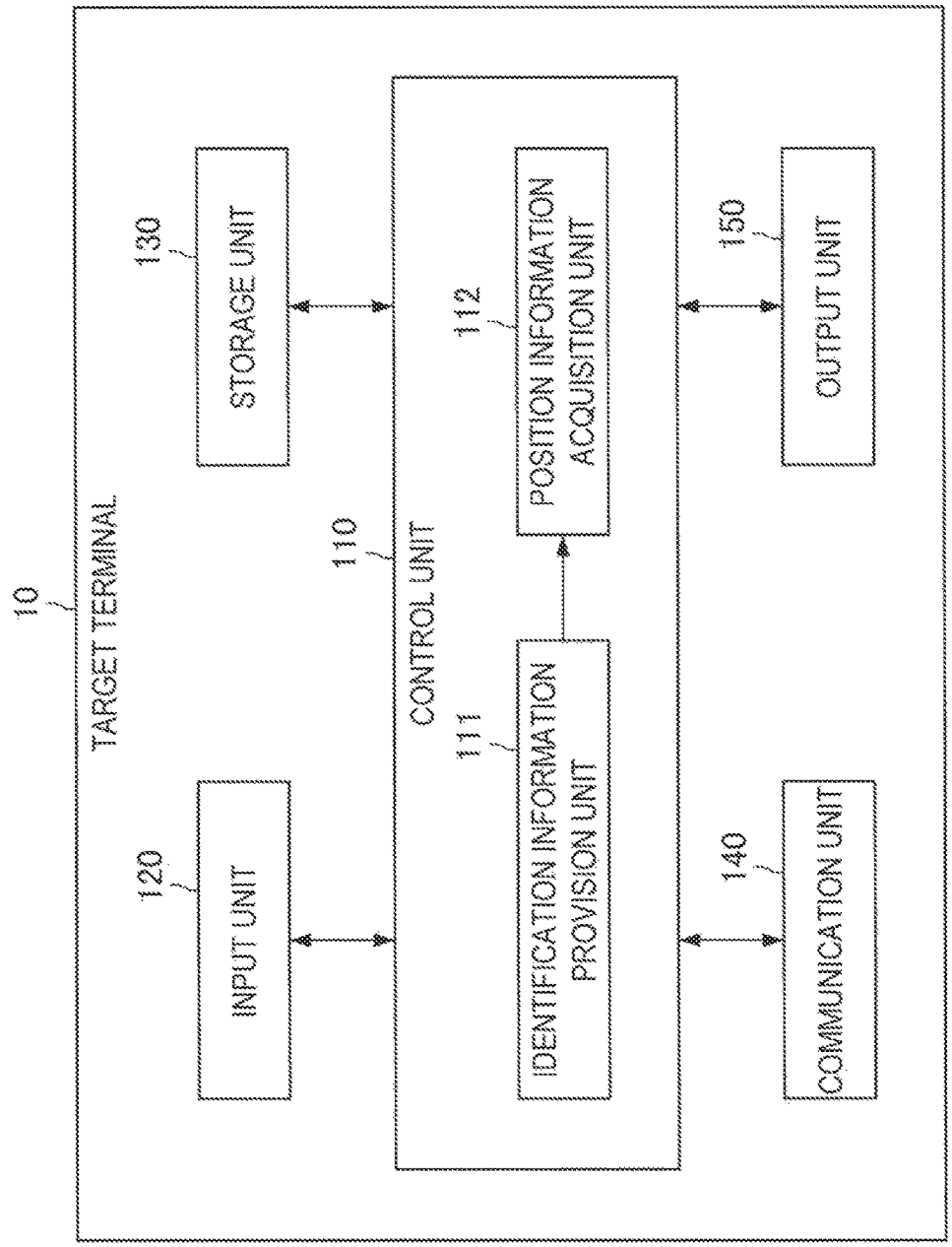
FIG. 2 is a diagram showing a functional configuration example of a target terminal according to the first embodiment of the present disclosure.

Next, a functional configuration example of the target terminal 10 according to the first embodiment of the present disclosure will be described. FIG. 2 is a diagram showing the functional configuration example of the target terminal 10 according to the first embodiment of the present disclosure. As shown in FIG. 2, the target terminal 10 according to the first embodiment of the present disclosure includes a control unit 110, an input unit 120, a storage unit 130, a communication unit 140, and an output unit 150.

The control unit 110 corresponds to, for example, a processor, such as a central processing unit (CPU) or the like. The control unit 110 executes programs stored in the storage unit 130 or other storage media to exhibit various functions possessed by the control unit 110. The control unit 110 has an identification information provision unit 111 and a position information acquisition unit 112. Functions possessed by these functional blocks will be described below.

The input unit 120 detects and outputs the user's operation to the control unit 110. In the description herein, it is assumed that the input unit 120 includes a touchscreen, and therefore, the user's operation is input using the user's finger as an operation object. However, the input unit 120 may include other hardware instead of a touchscreen. Although, in the example shown in FIG. 2, the input unit 120 is integrated with the target terminal 10, the input unit 120 may be separated from the target terminal 10.

The storage unit 130 stores programs for operating the control unit 110 using a storage medium, such as a semiconductor memory, hard disk, or the like. Also, for example, the storage unit 130 can store various items of data that are used by programs. Although, in the example shown in FIG. 2, the storage unit 130 is integrated with the target terminal 10, the storage unit 130 may be separated from the target terminal 10.

The communication unit 140 can communicate with other apparatuses (e.g., the information processing apparatus 40, the base stations 20, etc.). The communication unit 140, for example, when communicating with the information processing apparatus 40, can perform communication via a base station 20. The communication scheme of the communication unit 140 is not particularly limited. The communication of the communication unit 140 may be wireless communication. Although, in the example shown in FIG. 2, the communication unit 140 is integrated with the target terminal 10, the communication unit 140 may be separated from the target terminal 10.

The output unit 150 has the function of outputting various items of information under the control of the control unit 110. The items of information output by the output unit 150 are not particularly limited. Therefore, the information output by the output unit 150 may be an image (e.g., a still image, moving image, etc.) or audio. In the description that follows, the output unit 150 is mainly assumed to be a display device. Alternatively, the output unit 150 may be other output devices (e.g., an audio output device). Although, the example shown in FIG. 2, the output unit 150 is integrated with the target terminal 10, the output unit 150 may be separated from the target terminal 10.

1-3. Functional Configuration Example of Information Processing Apparatus

Figure 3:
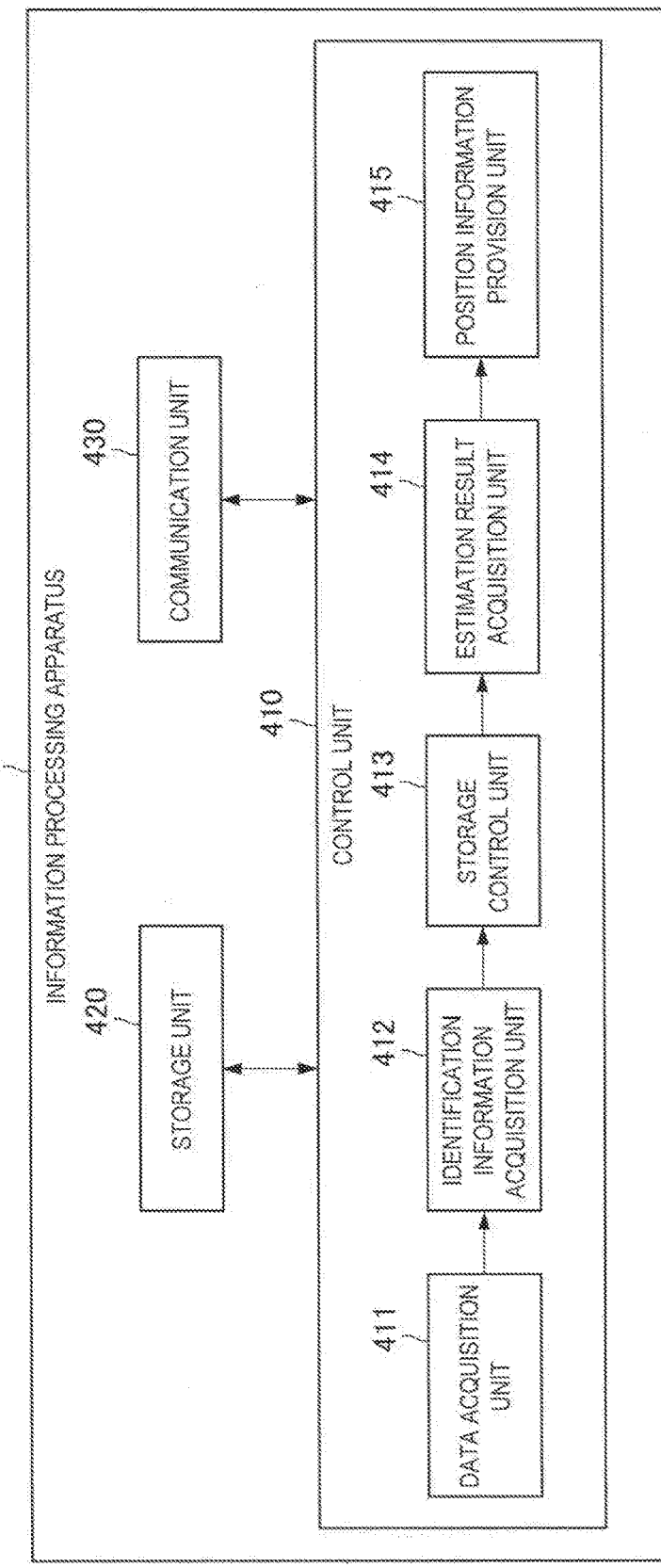
FIG. 3 is a diagram showing a functional configuration example of an information processing apparatus according to the first embodiment of the present disclosure.

Next, a functional configuration example of the information processing apparatus 40 according to the first embodiment of the present disclosure will be described. FIG. 3 is a diagram showing the functional configuration example of the information processing apparatus 40 according to the first embodiment of the present disclosure. As shown in FIG. 3, the information processing apparatus 40 according to the first embodiment of the present disclosure includes a control unit 410, a storage unit 420, and a communication unit 430.

The control unit 410 corresponds to, for example, a processor, such as a central processing unit (CPU) or the like. The control unit 410 executes programs stored in the storage unit 420 or other storage media to exhibit various functions possessed by the control unit 410. The control unit 410 has a data acquisition unit 411, an identification information acquisition unit 412, a storage control unit 413, an estimation result acquisition unit 414, and a position information provision unit 415. These functional blocks and their functions will be described below.

The storage unit 420 stores programs for operating the control unit 410 using a storage medium, such as a semiconductor memory, hard disk, or the like. Also, for example, the storage unit 420 can store various items of data that are used by programs. Although, in the example shown in FIG. 3, the storage unit 420 is integrated with the information processing apparatus 40, the storage unit 420 may be separated from the information processing apparatus 40.

The communication unit 430 can communicate with other apparatuses (e.g., the target terminals 10, the base stations 20, etc.). The communication unit 430, for example, when communicating with a target terminal 10, can perform communication via a base station 20. The communication scheme of the communication unit 430 is not particularly limited. The communication of the communication unit 430 may be wireless communication or wired communication. Although, in the example shown in FIG. 3, the communication unit 430 is integrated with the information processing apparatus 40, the communication unit 430 may be separated from the information processing apparatus 40.

1-4. Details of Function of Information Processing System

Next, details of functions of the information processing system 1 according to the first embodiment of the present disclosure will be described. As described above, the control apparatus 30 stores the IP addresses of the target terminals 10 and the MAC addresses of the target terminals 10 as information related to the target terminals 10 of the base stations 20. Therefore, the data acquisition unit 411 of the information processing apparatus 40 can acquire the MAC addresses of the target terminals 10, which are associated with the IP addresses of the target terminals 10, from the control apparatus 30.

Figure 4:
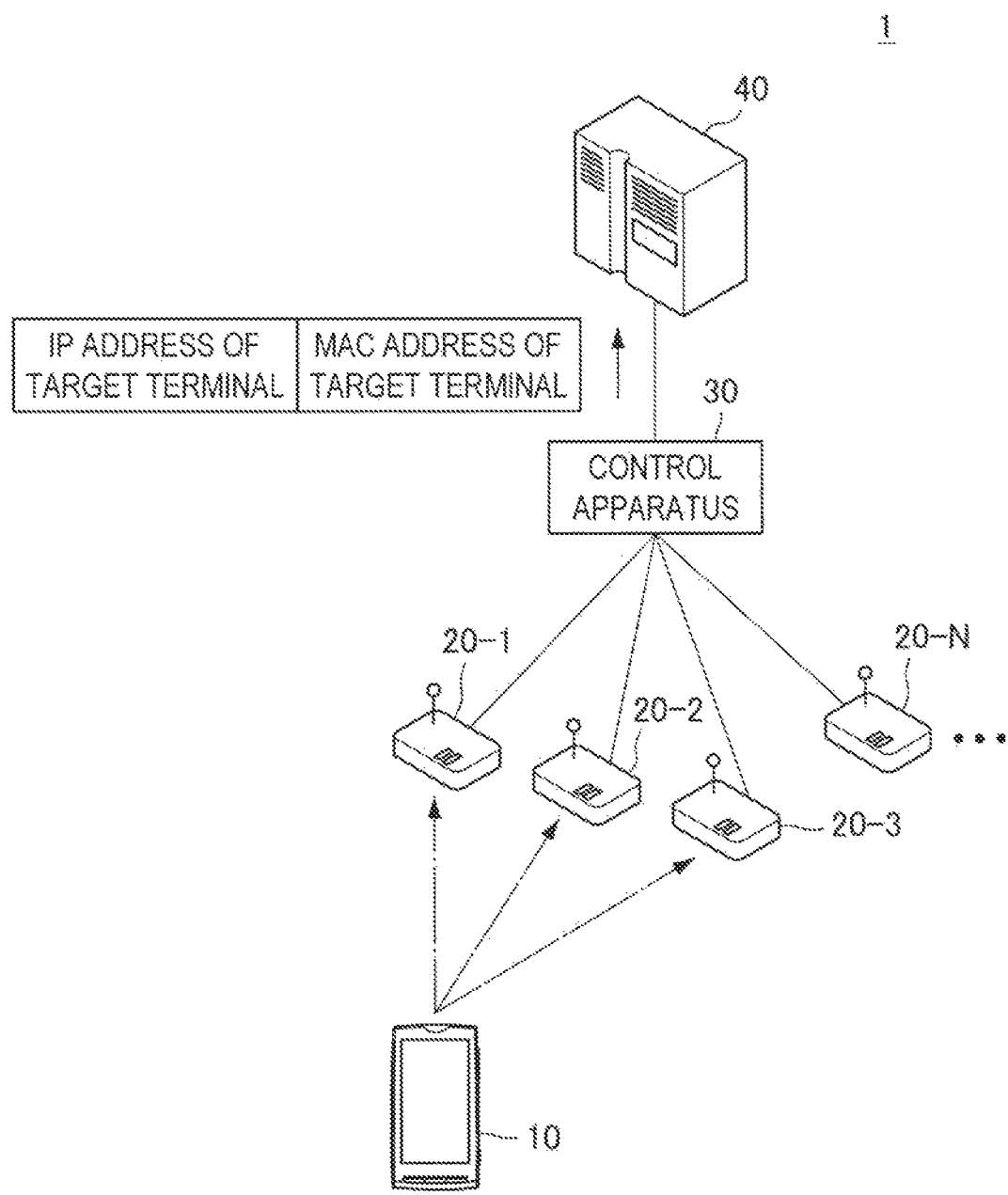
FIG. 4 is a diagram for describing a function example of acquiring the MAC address of a target terminal connected to a base station, that is associated with the IP address of the target terminal, according to the first embodiment of the present disclosure.

FIG. 4 is a diagram for describing a function example of acquiring the MAC address of a target terminal 10 connected to a base station 20, that is associated with the IP address of the target terminal 10. For example, the data acquisition unit 411 of the information processing apparatus 40 may provide an address acquisition request to the control apparatus 30. Thereafter, as shown in FIG. 4, the data acquisition unit 411 may acquire information in which the IP address of a target terminal 10 connected to a base station 20 is associated with the MAC address of the target terminal 10, as a response to the address acquisition request, from the control apparatus 30.

Meanwhile, a universally unique identifier (UUID) is provided as the identification information of an instance that is automatically generated by an application executed by a target terminal 10. The UUID is unique identification information, i.e., no two or more instances have the same UUID value. UUIDs are controlled so that one UUID and another UUID do not have the same value. Therefore, when a target terminal 10 is connected to a base station 20, the identification information provision unit 111 may provide a UUID associated with the IP address of the target terminal 10 to the information processing apparatus 40.

The timing at which a UUID associated with the IP address of a target terminal 10 is provided to the information processing apparatus 40 is not limited, and may be when the target terminal 10 is connected to a base station 20 in a facility for the first time after installation of a predetermined application, or when the UUID is changed. Although, in the description herein, a case where an application that uses the position information of a target terminal 10 is used as the predetermined application is mainly described, the predetermined application is not particularly limited.

Although, in the description herein, a case where a UUID is provided to the information processing apparatus 40 will be mainly described, other identification information, excluding the MAC address of a target terminal 10, may be provided to the information processing apparatus 40 instead of a UUID. Therefore, the UUID is an example of the predetermined identification information. A UUID may be issued by a server or an application. For example, when an application is newly installed, the application may provide a UUID issuance request to a server, which then newly issues a UUID, and thereafter, acquire the UUID as a response to the UUID issuance request. Alternatively, an application may issue and provide a UUID to a server. Here, when the identification information provision unit 111 of a target terminal 10 provides a UUID associated with the IP address of the target terminal 10 to the information processing apparatus 40, the identification information acquisition unit 412 of the information processing apparatus 40 acquires, from the target terminal 10, the UUID associated with the IP address of the target terminal 10.

Figure 5:
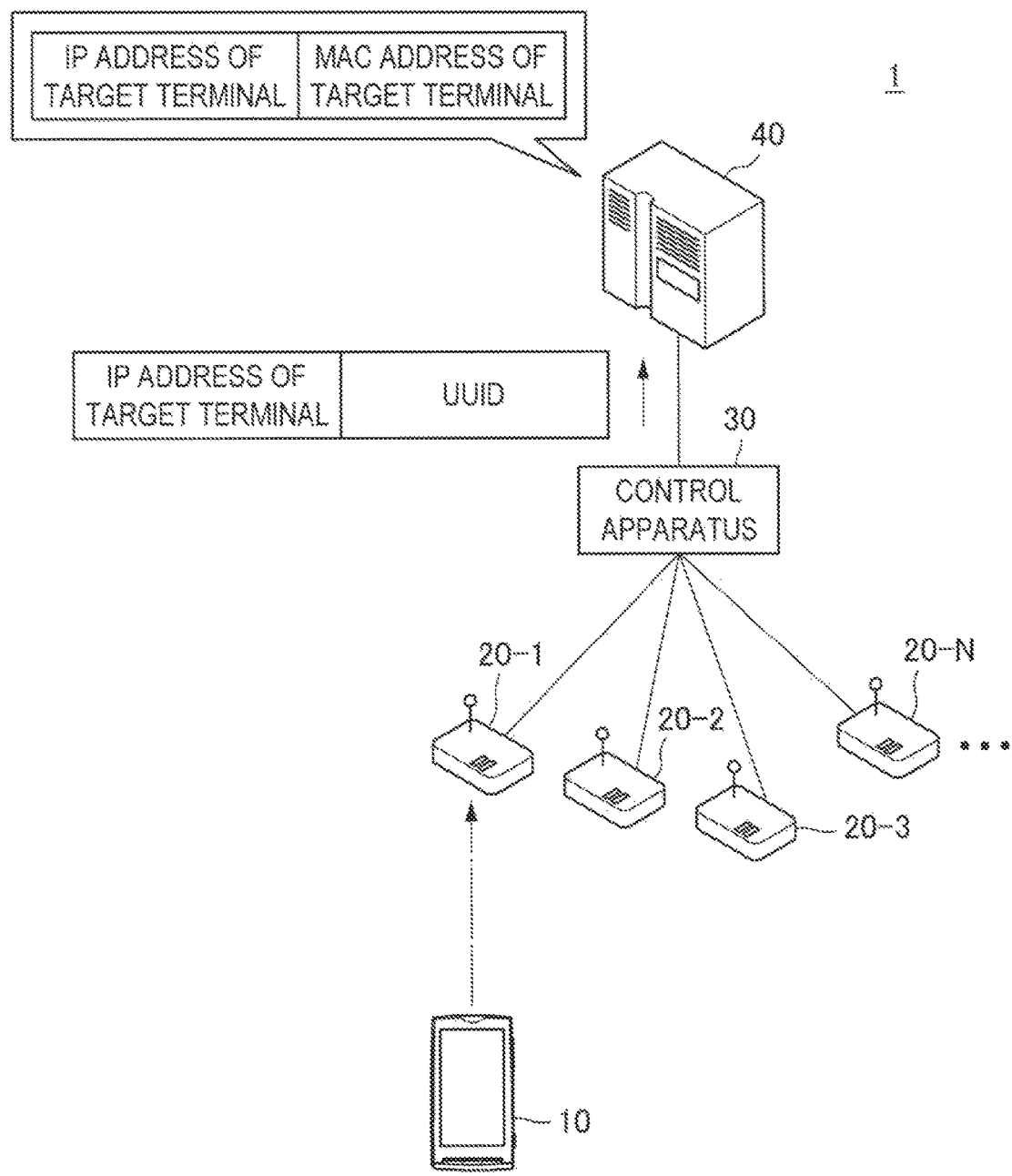
FIG. 5 is a diagram for describing a function example of acquiring a UUID associated with the IP address of a target terminal according to the first embodiment of the present disclosure.

FIG. 5 is a diagram for describing a function example of acquiring a UUID associated with the IP address of a target terminal 10. For example, as shown in FIG. 5, when a target terminal 10 is connected to a base station 20 in a facility for the first time after installation of an application, the identification information provision unit 111 of the target terminal 10 may provide information in which the IP address of the target terminal 10 is associated with a UUID to the information processing apparatus 40. At this time, the identification information acquisition unit 412 of the information processing apparatus 40 may acquire the information in which the IP address of the target terminal 10 is associated with a UUID from the target terminal 10.

Thus, the data acquisition unit 411 acquires the MAC address of a target terminal 10 associated with the IP address of the target terminal 10, and the identification information acquisition unit 412 acquires a UUID associated with the IP address of the target terminal 10. Here, when the MAC address of a target terminal 10 and a UUID which are associated with the same IP address of a target terminal 10 have been acquired, the MAC address and the UUID are considered to have been acquired from the same target terminal 10. Therefore, the storage control unit 413 may store the MAC address and the UUID in the storage unit 420 in association with each other.

Figure 6:
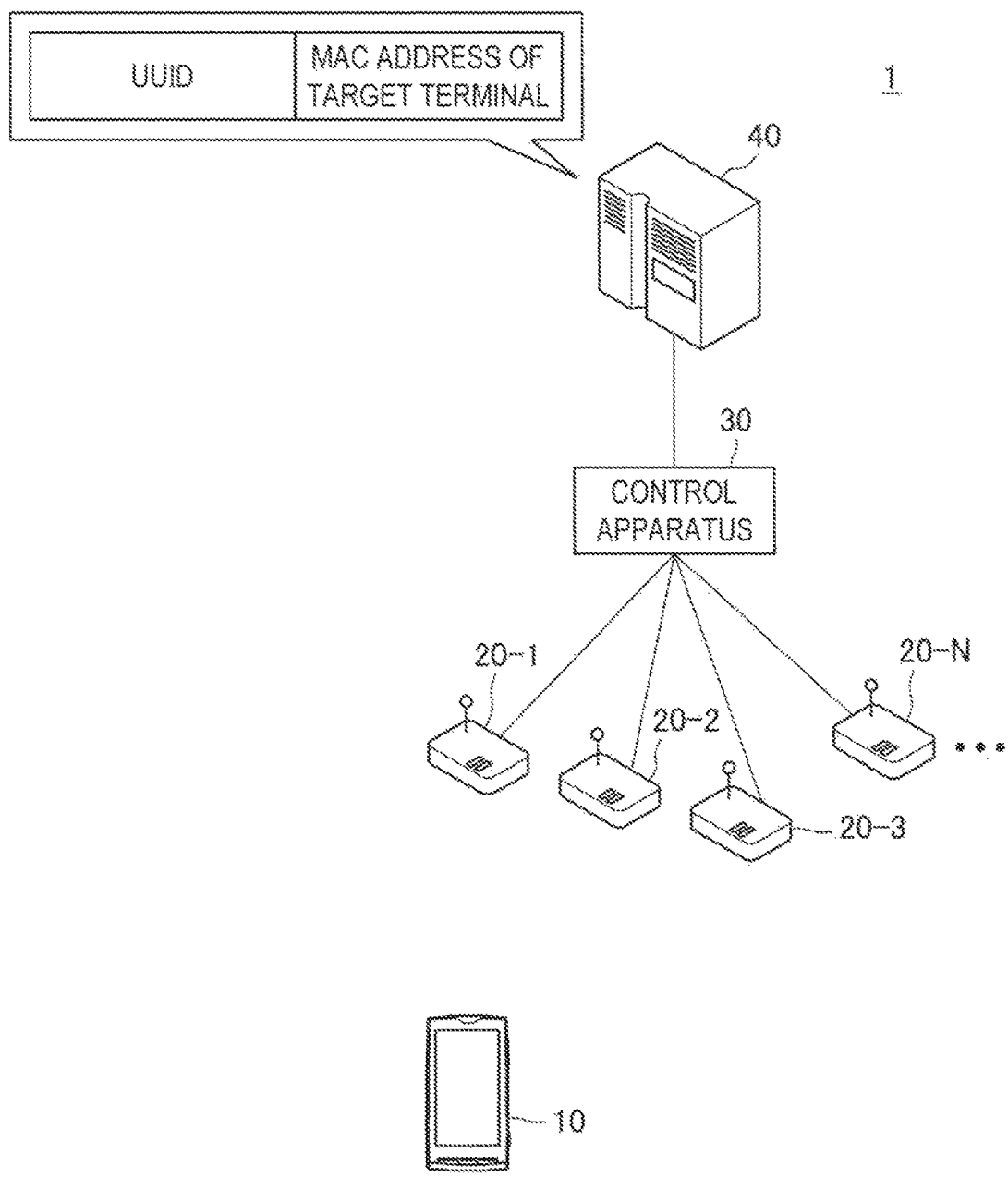
FIG. 6 is a diagram for describing a function example of storing the MAC address of a target terminal and a UUID in association with each other according to the first embodiment of the present disclosure.

FIG. 6 is a diagram for describing a function example of storing the MAC address of a target terminal 10 and a UUID in association with each other. It is assumed that, as described above, the data acquisition unit 411 has acquired information in which the IP address of a target terminal 10 is associated with the MAC address of the target terminal 10, and the identification information acquisition unit 412 has acquired information in which the IP address of the target terminal 10 is associated with a UUID. In this case, as shown in FIG. 6, the storage control unit 413 may store the UUID and the MAC address of the target terminal 10 in the storage unit 420 in association with each other.

Here, the estimation result acquisition unit 414 of the information processing apparatus 40 acquires the position information of the target terminals 10 for each of the MAC addresses of the target terminals 10. In the description herein, an example in which the estimation result acquisition unit 414 estimates the position information of the target terminals 10 for each of the MAC addresses of the target terminals 10. Alternatively, the position information of the target terminals 10 which is estimated by another position estimation device instead of the information processing apparatus 40 for each of the MAC addresses corresponding to the target terminals 10, may be acquired by the estimation result acquisition unit 414.

The position of the target terminal 10 can be estimated using various techniques. For example, the estimation result acquisition unit 414 may designate the position information of a base station 20 which is a sender of a radio signal received by a target terminal 10, as the position information of the target terminal 10. Alternatively, the estimation result acquisition unit 414 may estimate the position information of a target terminal 10 on the basis of the strength of a radio signal received by the target terminal 10 and the position information of a base station 20 which is a sender of the radio signal. For example, the estimation result acquisition unit 414 may calculate a distance corresponding to the reception strength, and estimate position information indicating a position that is the distance away from the base station 20 as the position information of the target terminal 10.

Also, when there are a plurality of base stations 20 that have transmitted a radio signal to a target terminal 10, the estimation result acquisition unit 414 may estimate the position information of the target terminal 10 on the basis of the position information of each of the plurality of base stations 20. For example, the estimation result acquisition unit 414 may estimate the position information of the target terminal 10 by the principle of triangulation on the basis of the position information of each of the plurality of base stations 20 and the strength of a radio signal received by the target terminal 10 which has been transmitted from each of the plurality of base stations 20.

For example, the estimation result acquisition unit 414 may acquire the MAC address of a target terminal 10 that has received a radio signal, the strength of the radio signal received by the target terminal 10, and the MAC address of a base station 20 that is a sender of the radio signal, from the target terminal 10. Also, the estimation result acquisition unit 414 can estimate the position information of the target terminals 10 for each of the MAC addresses of the target terminals 10.

Alternatively, the estimation result acquisition unit 414 may designate the position information of a base station 20 that has received a radio signal from a target terminal 10 as the position information of the target terminal 10. Alternatively, the estimation result acquisition unit 414 may estimate the position information of the target terminal 10 on the basis of the strength of the radio signal received by the base station 20 and the position information of the base station 20. For example, the estimation result acquisition unit 414 may calculate a distance corresponding to the reception strength, and estimate position information indicating a position that is the distance away from the base station 20 as the position information of the target terminal 10.

Also, when there are a plurality of base stations 20 that have received a radio signal from a target terminal 10, the estimation result acquisition unit 414 may estimate the position information of the target terminal 10 on the basis of the position information of each of the plurality of base stations 20. For example, the estimation result acquisition unit 414 may estimate the position information of the target terminal 10 by the principle of triangulation on the basis of the position information of each of the plurality of base stations 20 and the strength of the radio signal received by each of the plurality of base stations 20.

For example, the estimation result acquisition unit 414 can acquire the MAC address of a target terminal 10 that has transmitted a radio signal, the strength of the radio signal received by a base station 20, and the MAC address of the base station 20 that has received the radio signal, from the control apparatus 30 via the base station 20. The estimation result acquisition unit 414 can estimate the position information of the target terminals 10 for each of the MAC addresses of the target terminals 10.

Also, the format of the position information is not particularly limited. For example, the format of the position information may be based on a latitude and a longitude, polar coordinates, or a vector. Alternatively, the position information may be facility-specific position information that is used in a predetermined facility (e.g., the inside of a building, etc.). The position information may include floor information indicating a floor in a building.

Note that if the position information of a base station 20 is previously stored in the storage unit 420, the position information of the base station 20 may be acquired from the storage unit 420. If the position information of a base station 20 is held by a server, the position information of the base station 20 may be acquired from the server via the communication unit 430. The server may be a contents management system (CMS) or the like provided for each facility. Also, if a radio signal transmitted from a base station 20 includes the position information of that base station 20, the position information of the base station 20 may be acquired from the transmitted radio signal.

Figure 7:
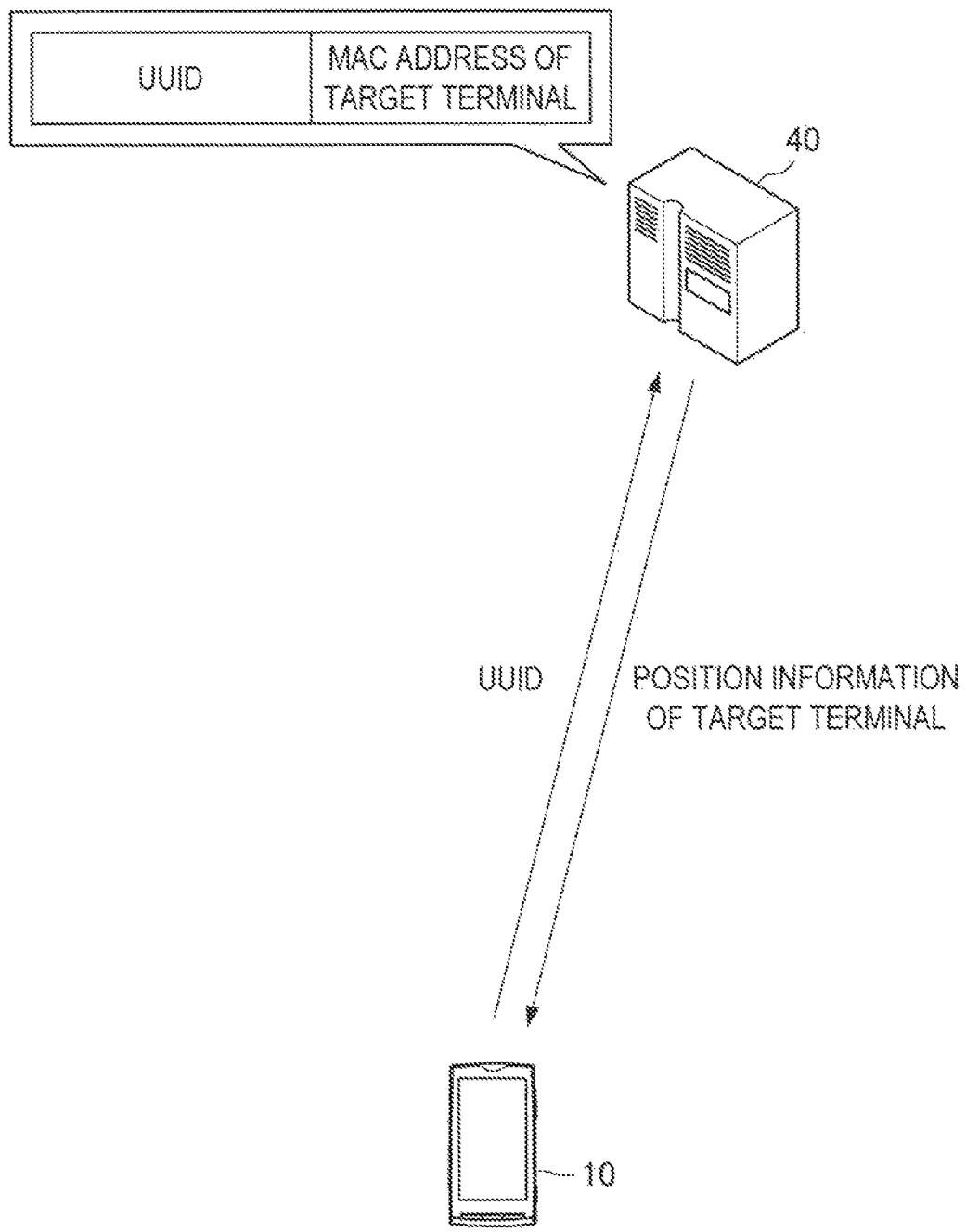
FIG. 7 is a diagram for describing a function example of an information processing apparatus according to the first embodiment of the present disclosure to provide the position information of a target terminal.

FIG. 7 is a diagram for describing a function example of the information processing apparatus 40 according to the first embodiment of the present disclosure to provide the position information of a target terminal 10. In a situation where the position information of a target terminal 10 has been estimated in the above manner, the position information acquisition unit 112 of the target terminal 10 provides a position estimation request including a UUID to the information processing apparatus 40 as shown in FIG. 7. The timing at which the position estimation request is provided is not limited. The position estimation request may be provided when the position information of a target terminal 10 is required in an application executed in the target terminal 10. The position estimation request may be provided at predetermined intervals.

Also, as shown in FIG. 7, the position information provision unit 415 of the information processing apparatus 40, when acquiring a position estimation request including a UUID from a target terminal 10, provides the position information of the target terminal 10 corresponding to the MAC address of the target terminal 10 associated with the UUID, to the target terminal 10. When the position information of the target terminal 10 is provided to the target terminal 10 by the position information provision unit 415, the target terminal 10 and the position information acquisition unit 112 acquires the position information of the target terminal 10 corresponding to the MAC address of the target terminal 10 associated with the UUID from the information processing apparatus 40.

As described above, according to the first embodiment of the present disclosure, a position estimation request including the MAC address of a target terminal 10 is not transmitted to the surroundings, and therefore, the risk that information related to the user of the target terminal 10 may be acquired by others can be reduced. Also, according to the first embodiment of the present disclosure, the possibility of leading to a violation of the user's privacy can be reduced.

Also, for some operating systems (OS) running on target terminals 10, the MAC address of a target terminal 10 cannot be specified by an application activated on the OS. According to the first embodiment of the present disclosure, it is not necessary to transmit a position estimation request including the MAC address of a target terminal 10, and therefore, it is expected that a target terminal 10 can transmit a position estimation request irrespective of the OS.

1-5. Operation Example of Information Processing System

Figure 8:
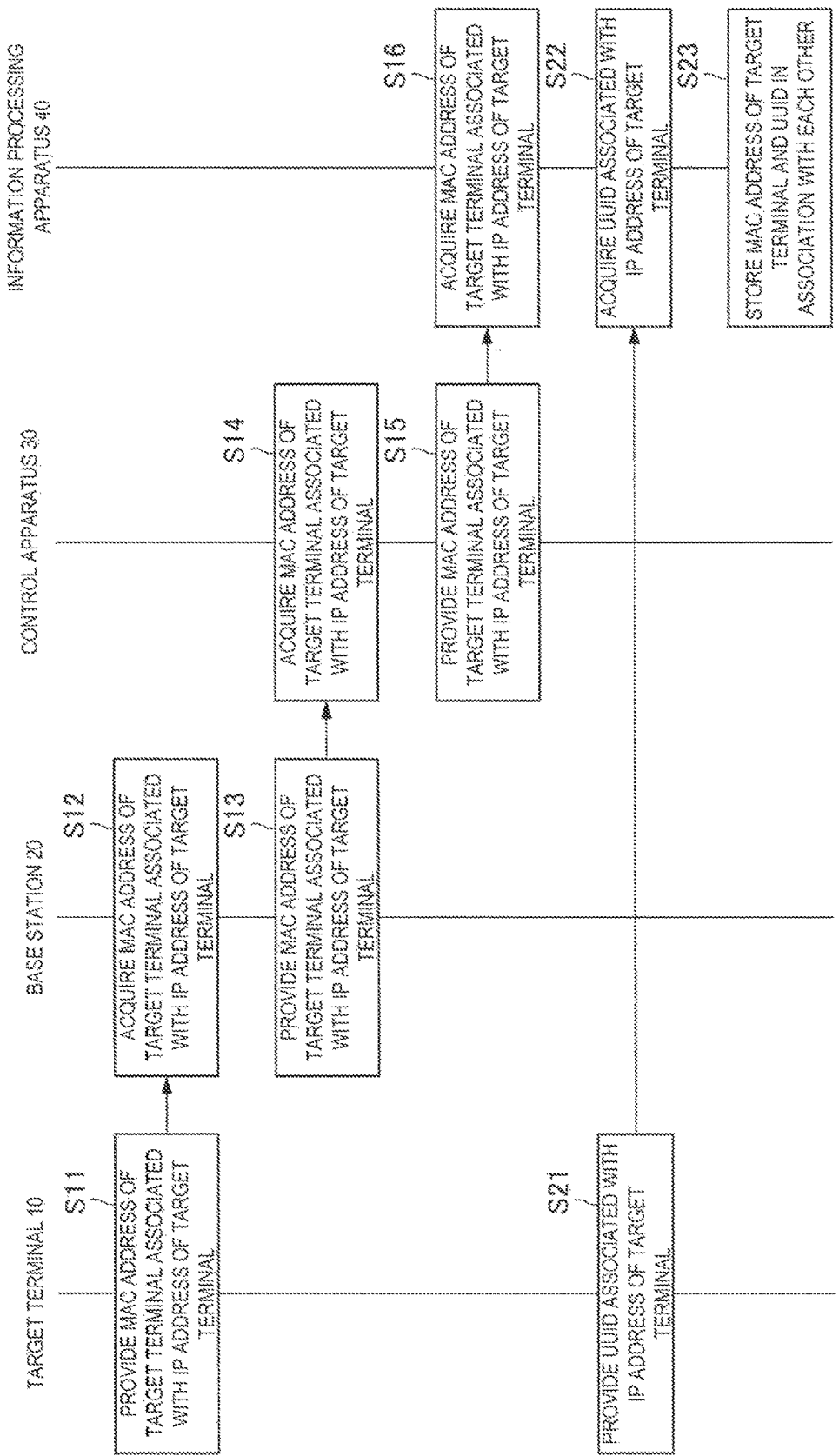
FIG. 8 is a flowchart showing an operation example in which, in an information processing system according to the first embodiment of the present disclosure, the MAC address of a target terminal and a UUID are stored in association with each other.

Next, an operation example of the information processing system 1 according to the first embodiment of the present disclosure will be described. Here, in particular, an operation example in which UUIDs are used as predetermined identification information will be described. FIG. 8 is a flowchart showing an operation example in which, in the information processing system 1 according to the first embodiment of the present disclosure, the MAC address of a target terminal 10 and a UUID are stored in association with each other. Note that the operation example of the information processing system 1 shown in FIG. 8 is merely for illustrative purposes. Therefore, the operation of the information processing system 1 is not limited to the operation example of the information processing system 1 shown in FIG. 8.

Initially, when a target terminal 10 is connected to a base station 20, the identification information provision unit 111 of the target terminal 10 provides the MAC address of the target terminal 10 associated with the IP address of the target terminal 10 to the base station 20 (S11). The base station 20 acquires the MAC address of the target terminal 10 associated with the IP address of the target terminal 10 from the target terminal 10 (S12). Next, the base station 20 provides the MAC address of the target terminal 10 associated with the IP address of the target terminal 10 to the control apparatus 30 (S13).

The control apparatus 30 acquires the MAC address of the target terminal 10 associated with the IP address of the target terminal 10 from the base station 20 (S14). Next, the control apparatus 30 provides the MAC address of the target terminal 10 associated with the IP address of the target terminal 10 to the information processing apparatus 40 (S15). In the information processing apparatus 40, the data acquisition unit 411 acquires the MAC address of the target terminal 10 associated with the IP address of the target terminal 10 (S16).

Next, when the target terminal 10 is connected to a base station 20 for the first time after installation of an application that uses the position information of the target terminal 10, the identification information provision unit 111 provides a UUID associated with the IP address of the target terminal 10 to the information processing apparatus 40 (S21). In the information processing apparatus 40, the identification information acquisition unit 412 acquires the UUID associated with the IP address of the target terminal 10 (S22), and the storage control unit 413 stores the MAC address and of the target terminal 10 and the UUID in the storage unit 420 in association with each other (S23).

Figure 9:
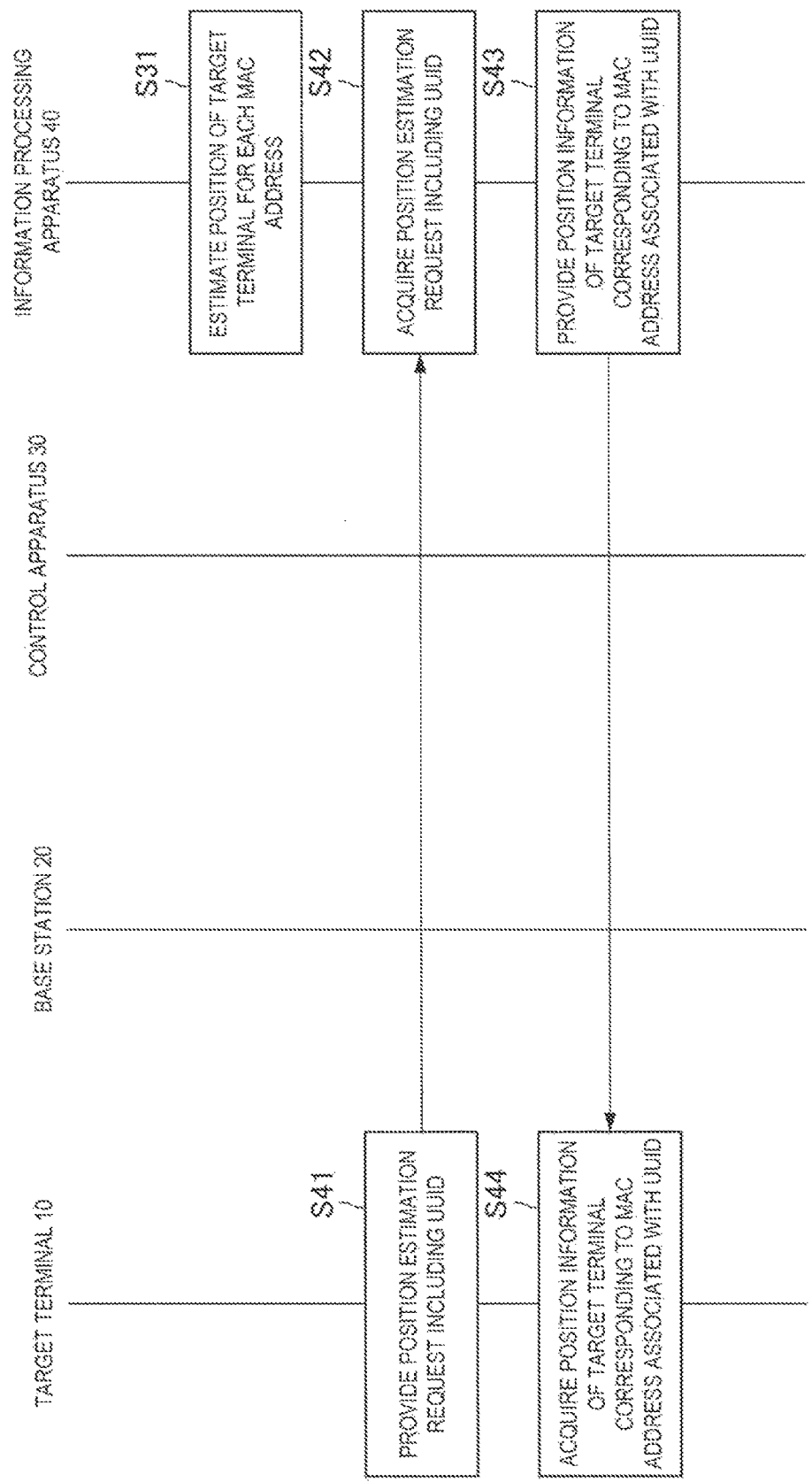
FIG. 9 is a flowchart showing an operation example in which, in an information processing system according to the first embodiment of the present disclosure, the position information of a target terminal is provided.

FIG. 9 is a flowchart showing an operation example in which, in the information processing system 1 according to the first embodiment of the present disclosure, the position information of a target terminal 10 is provided. Note that the operation example of the information processing system 1 shown in FIG. 9 is merely for illustrative purposes. Therefore, the operation of the information processing system 1 is not limited to the operation example of the information processing system 1 shown in FIG. 9.

In the information processing apparatus 40, the estimation result acquisition unit 414 estimates the position of the target terminal 10 for each MAC address (S31). In a target terminal 10, the position information acquisition unit 112, when the position information of the target terminal 10 is required in an application, provides a position estimation request including a UUID to the information processing apparatus 40 (S41). Next, in the information processing apparatus 40, the position information provision unit 415 acquires the position estimation request including a UUID from the target terminal 10 (S42).

Next, in the information processing apparatus 40, when the position estimation request is acquired, the position information provision unit 415 provides the position information of the target terminal 10 corresponding to the MAC address associated with the UUID to the target terminal 10 (S43). In the target terminal 10, the position information acquisition unit 112 acquires the position information of the target terminal 10 corresponding to the MAC address associated with the UUID from the information processing apparatus 40 (S44).

2. Second Embodiment

Next, a second embodiment of the present disclosure will be described. In the first embodiment of the present disclosure, an example in which the information processing apparatus 40 uses a UUID associated with the IP address of a target terminal 10 and the MAC address of the target terminal 10 associated with the IP address of the target terminal 10, has been described. However, the IP address of a target terminal 10 may change over time, or a target terminal 10 may not be uniquely identified.

With this in mind, in the second embodiment of the present disclosure, an example in which, in order to improve the accuracy of the position information of a target terminal 10 acquired in the target terminal 10, the MAC address of a base station 20 is used in addition to the IP address of the target terminal 10, will be described. Note that, in the description of the second embodiment of the present disclosure, similarities between the first embodiment of the present disclosure and the second embodiment of the present disclosure will not be described.

2-1. Details of Functions of Information Processing System

Details of functions of the information processing system 1 according to the second embodiment of the present disclosure will be described. The control apparatus 30 stores, as information related to the target terminal 10 connected to the base station 20, the IP address of the target terminal 10 and the MAC address of the target terminal 10 for each of the MAC addresses of the base stations 20. Therefore, the data acquisition unit 411 of the information processing apparatus 40 acquires the MAC addresses of the target terminals 10 associated with the IP address of the target terminals 10 and the MAC addresses of the base stations 20 from the control apparatus 30.

Figure 10:
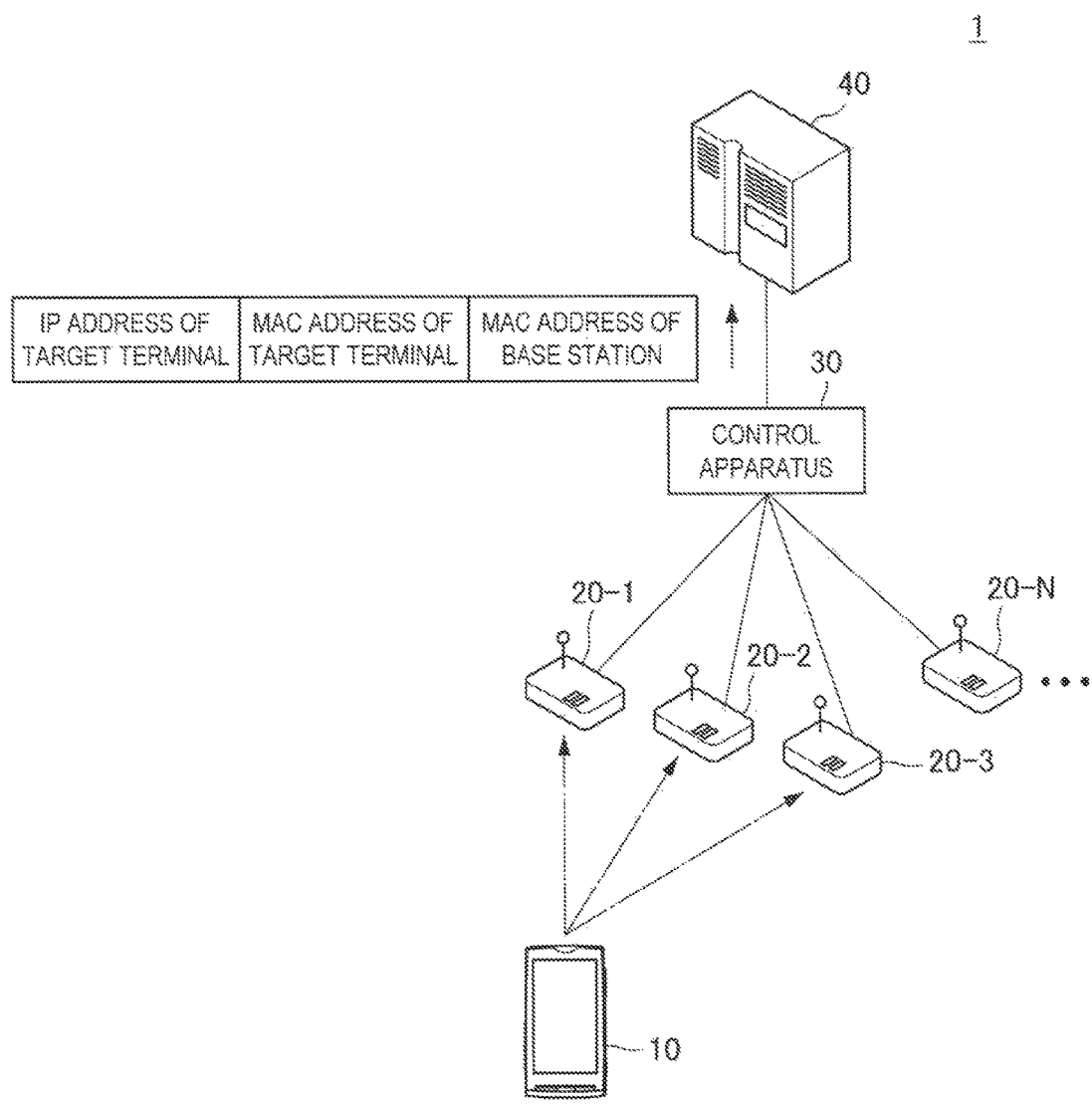
FIG. 10 is a diagram for describing a function example of acquiring the MAC address of a target terminal connected to a base station, that is associated with the IP address of the target terminal and the MAC address of the base station, according to a second embodiment of the present disclosure.

FIG. 10 is a diagram for describing a function example of acquiring the MAC address of a target terminal 10 connected to a base station 20, that is associated with the IP address of the target terminal 10 and the MAC address of the base station 20, according to the second embodiment of the present disclosure. For example, the data acquisition unit 411 of the information processing apparatus 40 may provide an address acquisition request to the control apparatus 30. Thereafter, as shown in FIG. 10, the data acquisition unit 411 may acquire, as a response to the address acquisition request, information in which the MAC address of the base station 20, the IP address of the target terminal 10 connected to the base station 20, and the MAC address of the target terminal 10 are associated with each other, from the control apparatus 30.

Also, when the target terminal 10 is connected to the base station 20, the identification information provision unit 111 may provide a UUID associated with the IP address of the target terminal 10 to the information processing apparatus 40. The timing at which the UUID is provided to the information processing apparatus 40 is not limited, as in the first embodiment of the present disclosure. When the identification information provision unit 111 of the target terminal 10 provides the UUID associated with the IP address of the target terminal 10 to the information processing apparatus 40, the identification information acquisition unit 412 of the information processing apparatus 40 acquires the UUID associated with the IP address of the target terminal 10 from the target terminal 10.

Figure 11:
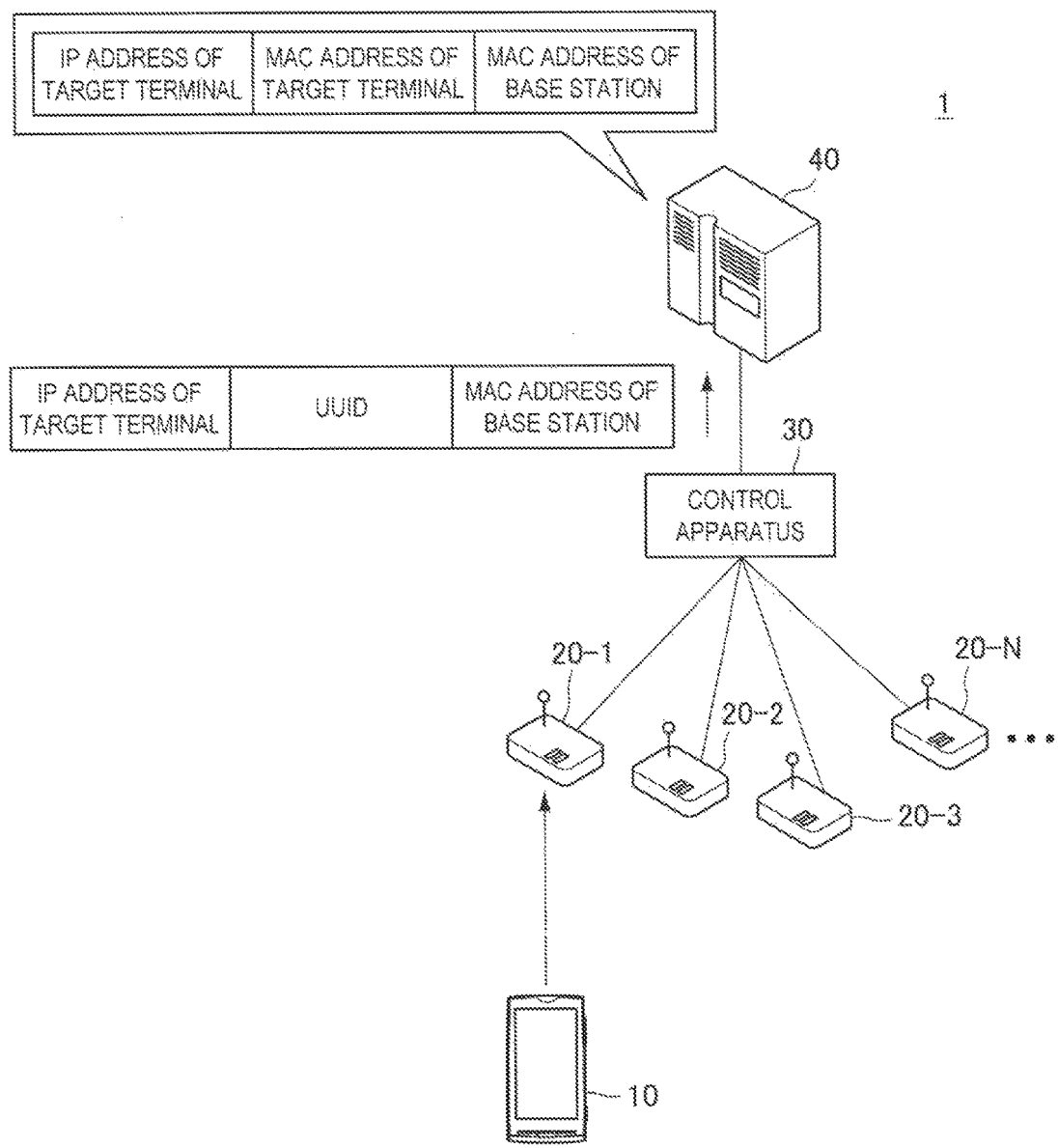
FIG. 11 is a diagram for describing a function example of an information processing apparatus according to the second embodiment of the present disclosure to acquire a UUID associated with the IP address of a target terminal and the MAC address of a base station.

FIG. 11 is a diagram for describing a function example of the information processing apparatus 40 according to the second embodiment of the present disclosure to acquire a UUID associated with the IP address of a target terminal 10 and the MAC address of a base station 20. For example, when, as shown in FIG. 11, a target terminal 10 is connected to a base station 20 in a facility for the first time after installation of an application, the identification information provision unit 111 of the target terminal 10 may provide information in which the IP address of the target terminal 10, the MAC address of the base station 20, and the UUID are associated with each other, to the information processing apparatus 40. At this time, the identification information acquisition unit 412 of the information processing apparatus 40 may acquire the information in which the IP address of the target terminal 10, the MAC address of the base station 20, and the UUID are associated with each other, from the target terminal 10.

Thus, the data acquisition unit 411 acquires the MAC address of the target terminal 10 associated with the IP address of the target terminal 10 and the MAC address of the base station 20, and the identification information acquisition unit 412 acquires the UUID associated with the IP address of the target terminal 10 and the MAC address of the base station 20. Here, when the MAC address of the target terminal 10 and the UUID that are associated with the same combination of an IP address and the MAC address of a base station 20, have been acquired, the MAC address and the UUID are regarded as having been acquired from the same target terminal 10. Therefore, the storage control unit 413 may store the MAC address and the UUID in the storage unit 420 in association with each other.

As described above, in the second embodiment of the present disclosure, an example in which the MAC address of a base station 20 is used in addition to the IP address of a target terminal 10, has been described. It is expected that such a configuration can improve the accuracy of the position information of a target terminal 10 which is acquired by the target terminal 10. Note that, after the MAC address of a target terminal 10 and a UUID are stored in the storage unit 420 in association with each other, the information processing system 1 according to the second embodiment of the present disclosure may operate in a manner similar to that of the information processing system 1 according to the first embodiment of the present disclosure.

2-2. Operation Example of Information Processing System

Figure 12:
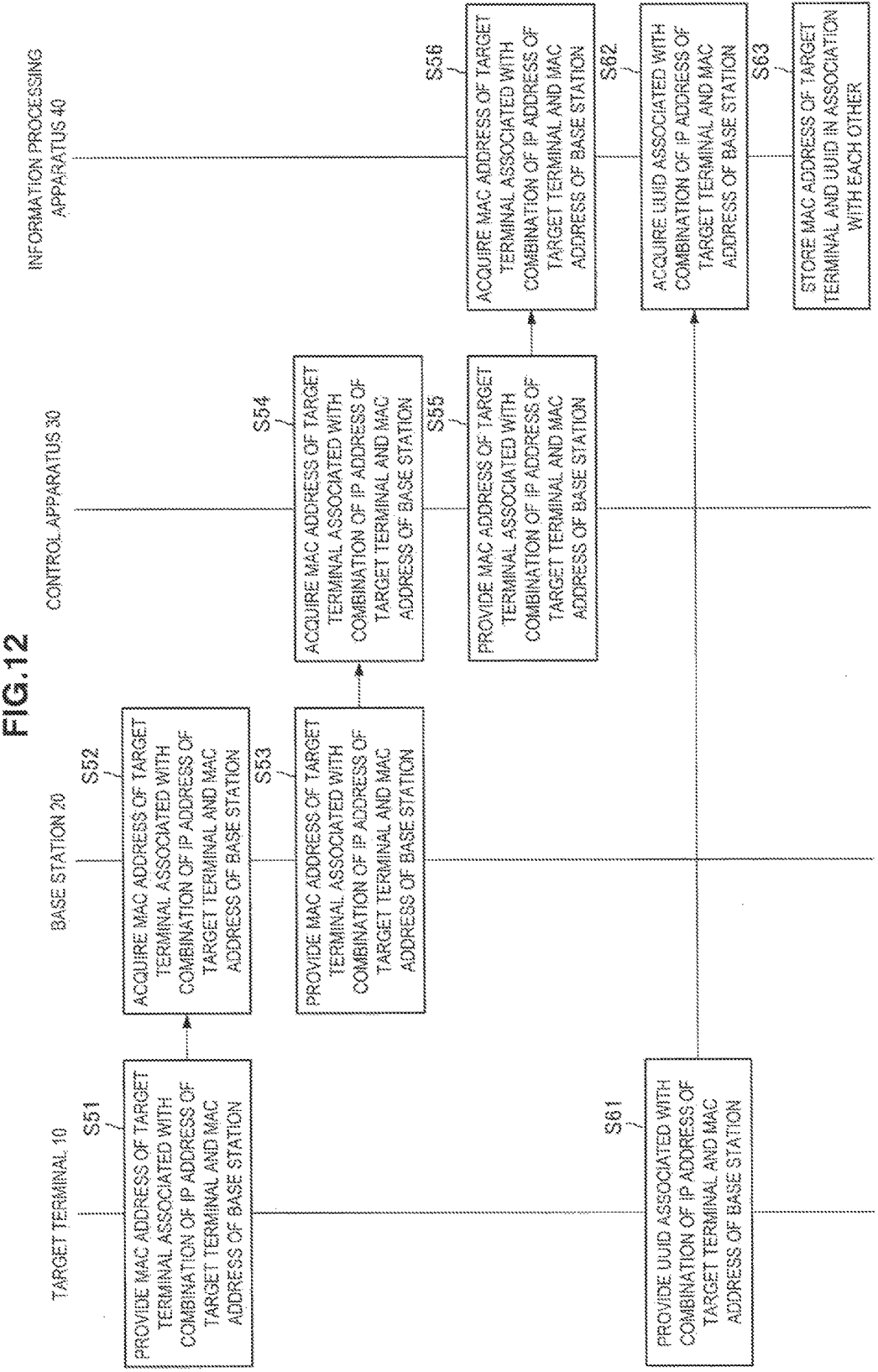
FIG. 12 is a flowchart showing an operation example in which, in an information processing system according to the second embodiment of the present disclosure, the MAC address of a target terminal and a UUID are stored in association with each other.

Next, an operation example of the information processing system 1 according to the second embodiment of the present disclosure will be described. Here, in particular, an operation example in which a UUID is used as the predetermined identification information will be described. FIG. 12 is a flowchart showing an operation example in which, in the information processing system 1 according to the second embodiment of the present disclosure, the MAC address of a target terminal 10 and a UUID are stored in association with each other. Note that the operation example of the information processing system 1 shown in FIG. 12 is merely for illustrative purposes. Therefore, the operation of the information processing system 1 is not limited to the operation example of the information processing system 1 shown in FIG. 12.

Initially, when a target terminal 10 is connected to a base station 20, the identification information provision unit 111 of the target terminal 10 provides the MAC address of the target terminal 10 which is associated with the combination of the IP address of the target terminal 10 and the MAC address of the base station 20, to the base station 20 (S51). The base station 20 acquires the MAC address of the target terminal 10 which is associated with the combination of the IP address of the target terminal 10 and the MAC address of the base station 20, from the target terminal 10 (S52). Next, the base station 20 provides the MAC address of the target terminal 10 which is associated with the combination of the IP address of the target terminal 10 and the MAC address of the base station 20, to the control apparatus 30 (S53).

The control apparatus 30 acquires the MAC address of the target terminal 10 which is associated with the combination of the IP address of the target terminal 10 and the MAC address of the base station 20, from the base station 20 (S54). Next, the control apparatus 30 provides the MAC address of the target terminal 10 which is associated with the combination of the IP address of the target terminal 10 and the MAC address of the base station 20, to the information processing apparatus 40 (S55). In the information processing apparatus 40, the data acquisition unit 411 acquires the MAC address of the target terminal 10 which is associated with the combination of the IP address of the target terminal 10 and the MAC address of the base station 20 (S56).

Next, when the target terminal 10 is connected to a base station 20 in a facility for the first time after installation of an application that uses the position information of the target terminal 10, the identification information provision unit 111 provides a UUID that is associated with the combination of the IP address of the target terminal 10 and the MAC address of the base station 20, to the information processing apparatus 40 (S61). In the information processing apparatus 40, the identification information acquisition unit 412 acquires the UUID that is associated with the combination of the IP address of the target terminal 10 and the MAC address of the base station 20 (S62), and the storage control unit 413 stores the MAC address of the target terminal 10 and the UUID in the storage unit 420 in association with each other (S63).

3. Hardware Configuration Examples

Figure 13:
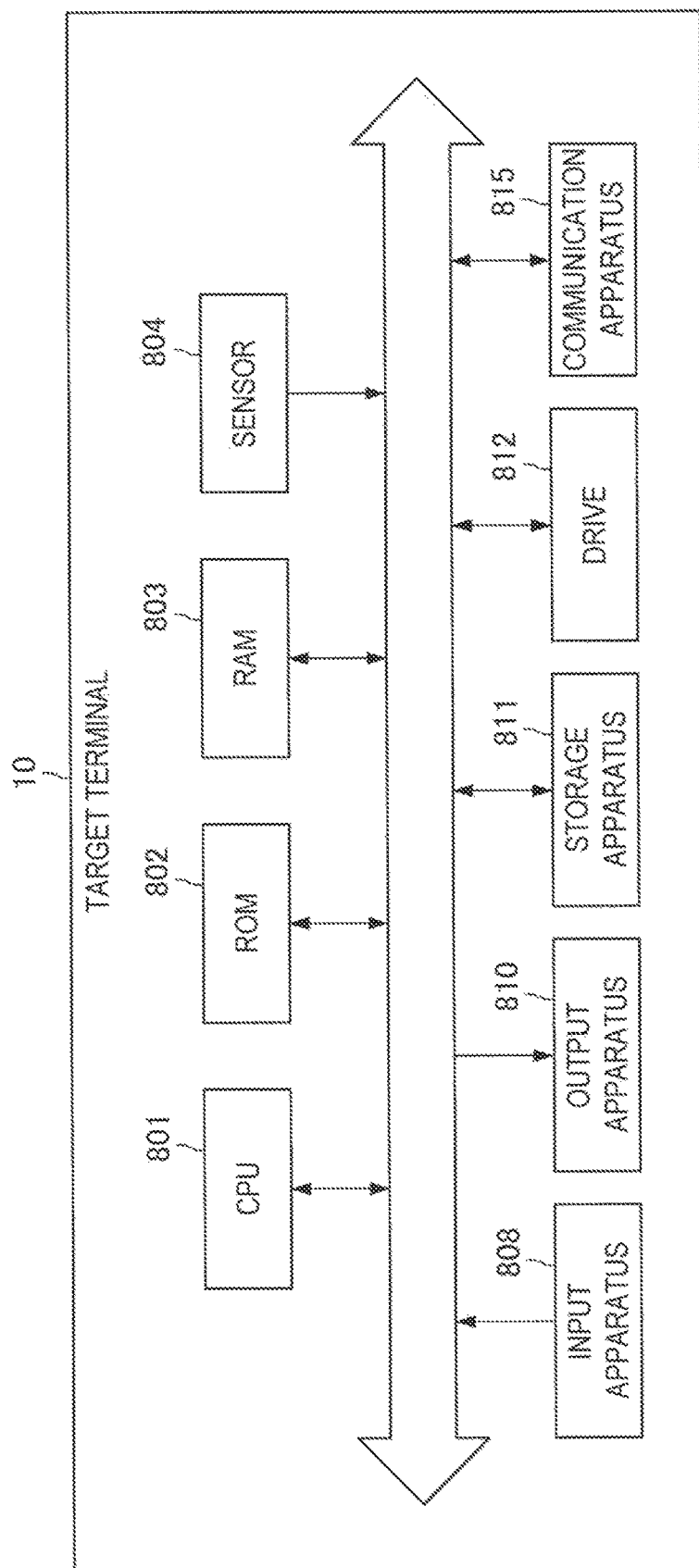
FIG. 13 is a diagram showing a hardware configuration example of a target terminal.

To continue, a hardware configuration example of the target terminal 10 according to an embodiment of the present disclosure will be described. FIG. 13 is a diagram showing a hardware configuration example of the target terminal 10 according to an embodiment of the present disclosure. However, the hardware configuration example shown in FIG. 13 merely shows an example of the hardware configuration of the target terminal 10. Therefore, the hardware configuration of the target terminal 10 is not limited to the example shown in FIG. 13.

As shown in FIG. 13, the target terminal 10 includes a CPU (Central Processing Unit) 801, a ROM (Read Only Memory) 802, a RAM (Random Access Memory) 803, a sensor 804, an input apparatus 808, an output apparatus 810, a storage apparatus 811, a drive 812, and a communication apparatus 815.

The CPU 801 functions as an operation processing apparatus and a control apparatus, and controls all the operations within the target terminal 10 in accordance with various programs. Further, the CPU 801 may be a microprocessor. The ROM 802 stores programs and operation parameters used by the CPU 801. The RAM 803 temporarily stores programs used in the execution of the CPU 801, and parameters which arbitrarily change in this execution. These sections are mutually connected by a host bus constituted from a CPU bus or the like.

The sensor 804 is constituted from various types of detection sensors and their peripheral circuits, such as a terminal state detection sensor for detecting a state of the target terminal 10. As an example, a positioning detection sensor (e.g., a Global Positioning System (GPS) sensor), an inclination sensor, an acceleration sensor, a direction sensor, a temperature sensor, a humidity sensor, an illuminance sensor or the like can be included as the sensor 804. A detection signal by the sensor 804 is sent to the CPU 801. In this way, the CPU 801 can know the state of the target terminal 10 (the position, inclination, acceleration, direction, temperature, humidity, illuminance or the like).

The input apparatus 808 includes an input unit, such as a mouse, a keyboard, a touch panel, buttons, a microphone, switches or leavers, for a user to input information, and an input control circuit which generates an input signal based on an input by the user, and outputs the input signal to the CPU 801. By operating the input apparatus 808, it is possible for the user of the target terminal 10 to input various data for the target terminal 10 and to order the process operations.

The output apparatus 910 includes functions to output various information. The output apparatus 910 is, for example, a display device such as a liquid crystal display (LCD) apparatus, an OLED (Organic Light Emitting Diode) apparatus, or a lamp. Alternatively, the output apparatus 810 may be a sound output apparatus such as a speaker or headphones. For example, the display device may display a captured image or a generated image. On the other hand, the sound output apparatus converts sound data and outputs sounds.

The storage apparatus 811 is an apparatus for data storage constituted as an example of a storage unit 130 of the target terminal 10. The storage apparatus 811 may include a storage medium, a recording apparatus which records data to the storage medium, a reading apparatus which reads data from the storage medium, and an erasure apparatus which erases data recorded in the storage medium. This storage apparatus 811 stores programs executed by the CPU 801 and various data.

The drive 812 is a reader/writer for the storage medium, and is built into the target terminal 10 or is externally attached. The drive 812 reads information recorded on a removable storage medium, such as a mounted magnetic disk, an optical disk, a magneto-optical disk, or a semiconductor memory, and outputs the information to the RAM 803. Further, the drive 812 can write information to the removable storage medium.

The communication apparatus 815 is, for example, a communication interface constituted by a communication device or the like for connecting to a network. Further, even if the communication apparatus 815 is a communication apparatus adaptive to wireless LAN (Local Area Network) or LTE (Long Term Evolution), the communication apparatus 815 may be a wired communication apparatus which communicates by wires. For example, it is possible for the communication apparatus 815 to communicate with other apparatuses via a network.

Figure 14:
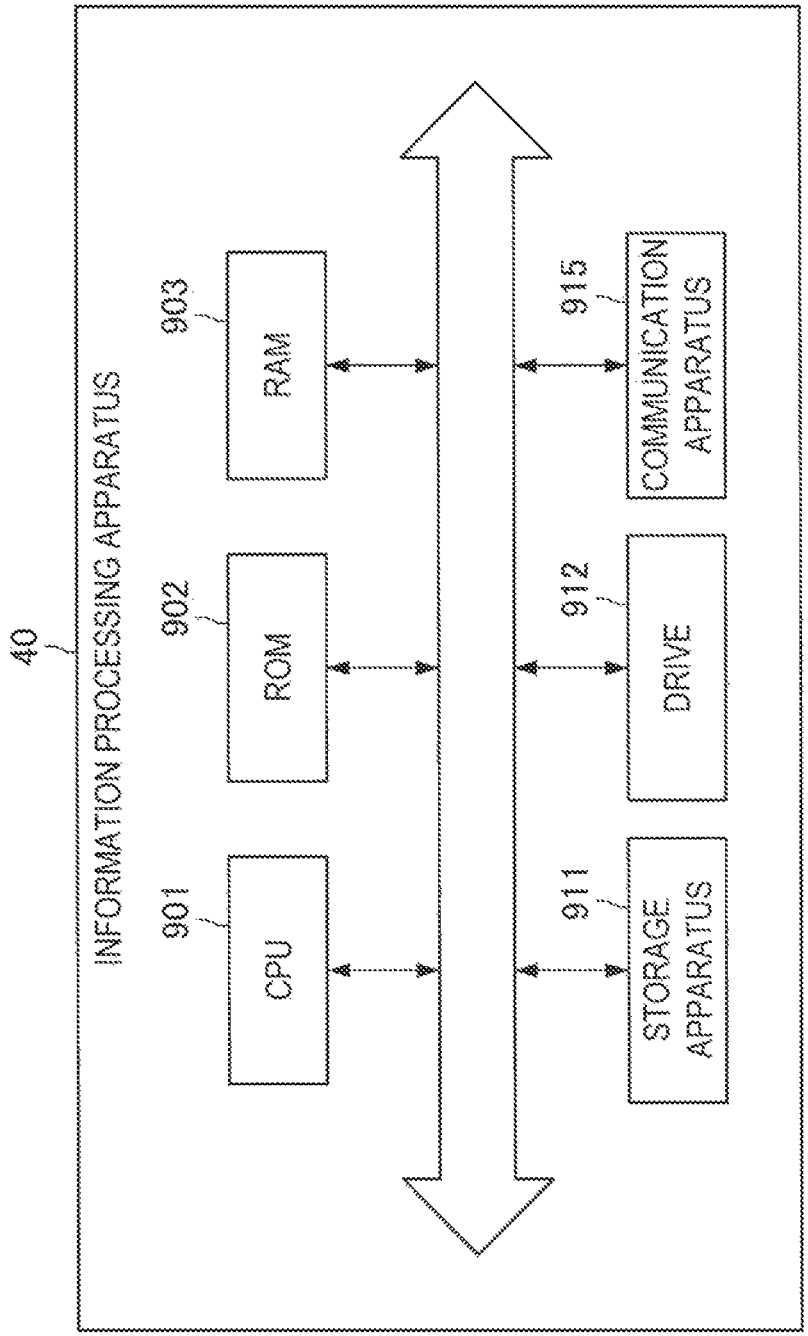
FIG. 14 is a diagram showing a hardware configuration example of an information processing apparatus.

To continue, a hardware configuration example of the information processing apparatus 40 according to an embodiment of the present disclosure will be described. FIG. 14 is a diagram showing a hardware configuration example of the information processing apparatus 40 according to an embodiment of the present disclosure. However, the hardware configuration example shown in FIG. 14 merely shows an example of the hardware configuration of the information processing apparatus 40. Therefore, the hardware configuration of the information processing apparatus 40 is not limited to the example shown in FIG. 14.

As shown in FIG. 14, the information processing apparatus 40 includes a CPU (Central Processing Unit) 901, a ROM (Read Only Memory) 902, a RAM (Random Access Memory) 903, a storage apparatus 911, a drive 912, and a communication apparatus 915.

The CPU 901 functions as an operation processing apparatus and a control apparatus, and controls all the operations within the information processing apparatus 40 in accordance with various programs. Further, the CPU 901 may be a microprocessor. The ROM 902 stores programs and operation parameters used by the CPU 901. The RAM 903 temporarily stores programs used in the execution of the CPU 901, and parameters which arbitrarily change in this execution. These sections are mutually connected by a host bus constituted from a CPU bus or the like.

The storage apparatus 911 is an apparatus for data storage constituted as an example of a storage unit 420 of the information processing apparatus 40. The storage apparatus 911 may include a storage medium, a recording apparatus which records data to the storage medium, a reading apparatus which reads data from the storage medium, and an erasure apparatus which erases data recorded in the storage medium. This storage apparatus 911 stores programs executed by the CPU 901 and various data.

The drive 912 is a reader/writer for the storage medium, and is built into the information processing apparatus 40 or is externally attached. The drive 912 reads information recorded on a removable storage medium, such as a mounted magnetic disk, an optical disk, a magneto-optical disk, or a semiconductor memory, and outputs the information to the RAM 903. Further, the drive 912 can write information to the removable storage medium.

The communication apparatus 815 is, for example, a communication interface constituted by a communication device or the like for connecting to a network. Further, even if the communication apparatus 815 is a communication apparatus adaptive to wireless LAN (Local Area Network) or LTE (Long Term Evolution), the communication apparatus 815 may be a wired communication apparatus which communicates by wires. For example, it is possible for the communication apparatus 815 to communicate with other apparatuses via a network.

4. Conclusion

As described above, according to the embodiments of the present disclosure, provided is the information processing apparatus 40 including the data acquisition unit 411, the identification information acquisition unit 412, the storage control unit 413, and the position information provision unit 415. The identification information acquisition unit 412 acquires, from a target terminal 10, predetermined identification information associated with the IP address of the target terminal 10. Also, the data acquisition unit 411 acquires the MAC address of the target terminal 10 associated with the IP address of the target terminal 10, from the control apparatus 30 for a base station 20 to which the target terminal 10 is connected.

The storage control unit 413 stores the predetermined identification information and the MAC address of the target terminal 10 in association with each other. Also, the position information provision unit 415, when acquiring a position estimation request including the predetermined identification information from the target terminal 10, provides the position information of the target terminal 10 corresponding to the MAC address of the target terminal 10 associated with the predetermined identification information, to the target terminal 10.

According to such a configuration, the position estimation request including the MAC address of the target terminal 10 is not transmitted to the surroundings, and therefore, the possibility that information related to the user of the target terminal 10 may be acquired by others can be reduced. Also, according to the first embodiment of the present disclosure, the possibility of leading to a violation of the user's privacy can be reduced.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, a program for causing hardware, such as a CPU, ROM and RAM built into a computer, to exhibit functions similar to the functions included in the above-described target terminal 10 can be created. Further, a recording medium can also be provided which records these programs and is capable of performing reading to the computer.

Further, a program for causing hardware, such as a CPU, ROM and RAM built into a computer, to exhibit functions similar to the functions included in the above described the information processing apparatus 40 can be created. Further, a recording medium can also be provided which records these programs and is capable of performing reading to the computer.

In addition, the effects described in the present specification are merely illustrative and demonstrative, and not limitative. In other words, the technology according to the present disclosure can exhibit other effects that are evident to those skilled in the art along with or instead of the effects based on the present specification. Additionally, the present technology may also be configured as below.

(1) An information processing apparatus including:
an identification information acquisition unit configured to acquire predetermined identification information associated with an IP address of a target terminal, from the target terminal;
a data acquisition unit configured to acquire a MAC address of the target terminal associated with the IP address of the target terminal, from a control apparatus for a base station to which the target terminal is connected;
a storage control unit configured to store the predetermined identification information and the MAC address of the target terminal in association with each other; and
a position information provision unit configured to, when acquiring a position estimation request including the predetermined identification information from the target terminal, provide position information of the target terminal corresponding to the MAC address of the target terminal associated with the predetermined identification information, to the target terminal.

(2) The information processing apparatus according to (1), including:
an estimation result acquisition unit configured to estimate the position information of the target terminals for each of the MAC addresses corresponding to the target terminals, to acquire the position information of the target terminals.

(3) The information processing apparatus according to (1) or (2), wherein the identification information acquisition unit acquires the IP address of the target terminal from the target terminal.

(4) The information processing apparatus according to any of (1) to 3, wherein the predetermined identification information includes at least a UUID.

(5) The information processing apparatus according to any of (1) to 4, wherein the identification information acquisition unit acquires the predetermined identification information associated with the IP address of the target terminal and a MAC address of the base station, from the target terminal, and wherein the data acquisition unit acquires the MAC address of the target terminal associated with the IP address of the target terminal and the MAC address of the base station, from the control apparatus for the base station.

(6) The information processing apparatus according to (5), wherein the identification information acquisition unit acquires the MAC address of the base station from the target terminal.

(7) The information processing apparatus according to (1), including:

an estimation result acquisition unit configured to acquire the position information of the target terminals estimated for each of the MAC addresses corresponding to the target terminals, from a position estimation device.

(8) An information processing method including:

acquiring predetermined identification information associated with an IP address of a target terminal, from the target terminal;

acquiring a MAC address of the target terminal associated with the IP address of the target terminal, from a control apparatus for a base station to which the target terminal is connected;

storing the predetermined identification information and the MAC address of the target terminal in association with each other; and providing, when a position estimation request including the predetermined identification information is acquired from the target terminal, position information of the target terminal corresponding to the MAC address of the target terminal associated with the predetermined identification information, to the target terminal.

(9) A program for causing a computer to function as an information processing apparatus including an identification information acquisition unit configured to acquire predetermined identification information associated with an IP address of a target terminal, from the target terminal, a data acquisition unit configured to acquire a MAC address of the target terminal associated with the IP address of the target terminal, from a control apparatus for a base station to which the target terminal is connected, a storage control unit configured to store the predetermined identification information and the MAC address of the target terminal in association with each other, and a position information provision unit configured to, when acquiring a position estimation request including the predetermined identification information from the target terminal, provide position information of the target terminal corresponding to the MAC address of the target terminal associated with the predetermined identification information, to the target terminal.

(10) A target terminal including:

an identification information provision unit configured to provide predetermined identification information associated with an IP address of the target terminal, to an information processing apparatus; and a position information acquisition unit configured to, when the information processing apparatus acquires a MAC address of the target terminal associated with the IP address of the target terminal from a control apparatus for a base station to which the target terminal is connected, and the predetermined identification information and the MAC address of the target terminal are associated with each other, provide a position estimation request including the predetermined identification information to the information processing apparatus, and acquire position information of the target terminal corresponding to the MAC address of the target terminal associated with the predetermined identification information, from the information processing apparatus.

(11) A communication method including:

providing predetermined identification information associated with an IP address of a target terminal, to an information processing apparatus; and when the information processing apparatus acquires a MAC address of the target terminal associated with the IP address of the target terminal from a control apparatus for a base station to which the target terminal is connected, and the predetermined identification information and the MAC address of the target terminal are associated with each other, providing a position estimation request including the predetermined identification information to the information processing apparatus, and acquiring position information of the target terminal corresponding to the MAC address of the target terminal associated with the predetermined identification information, from the information processing apparatus.

(12) A program for causing a computer to function as a target terminal including an identification information provision unit configured to provide predetermined identification information associated with an IP address of the target terminal, to an information processing apparatus, and a position information acquisition unit configured to, when the information processing apparatus acquires a MAC address of the target terminal associated with the IP address of the target terminal from a control apparatus for a base station to which the target terminal is connected, and the predetermined identification information and the MAC address of the target terminal are associated with each other, provide a position estimation request including the predetermined identification information to the information processing apparatus, and acquire position information of the target terminal corresponding to the MAC address of the target terminal associated with the predetermined identification information, from the information processing apparatus.

REFERENCE SIGNS LIST

1 information processing system
10 target terminal
20 base station
30 control apparatus
40 information processing apparatus
110 control unit
111 identification information provision unit
112 position information acquisition unit 120 input unit
130 storage unit
140 communication unit
150 output unit
410 control unit
411 data acquisition unit
412 identification information acquisition unit
413 storage control unit
414 estimation result acquisition unit
415 position information provision unit
420 storage unit
430 communication unit

The invention claimed is:

1. An information processing apparatus comprising:
processing circuitry configured to
  acquire a Media Access Control (MAC) address of a target terminal, wherein the MAC address of the target terminal is received from a controller communicably coupling one or more base stations and the information processing apparatus, wherein a base station from the one or more base stations receives the MAC address of the target terminal from the target terminal when the target terminal is initially connected to the base station, wherein the target terminal is identified based on a combination of an Internet Protocol (IP) address of the target terminal and a MAC address of the base station;
  acquire a Universally Unique Identifier (UUID) from a target terminal in response to the target terminal connecting to the base station for a first time after installation of an application that uses position information of the target terminal, wherein the UUID is configured to identify the target terminal when the combination of the IP address of the target terminal and the MAC address of the base station received from the target terminal match the combination of the IP address of the target terminal and the MAC address of the base station received from the controller;
  store the UUID and the MAC address of the target terminal, wherein the UUID is configured to uniquely identify the MAC address of the target terminal;
  determine position information of the target terminal based on a position of the base station; and
  securely provide the position information of the target terminal to the target terminal in response to receiving a position estimate request including only the UUID of the target terminal, wherein the MAC address of the target terminal is determined based on the UUID.

2. The information processing apparatus according to claim 1, wherein the processing circuitry is further configured to
  estimate the position information of a plurality of target terminals for each MAC addresses corresponding to the plurality of target terminals, to acquire the position information of the plurality of target terminals.

3. The information processing apparatus according to claim 1, wherein the processing circuitry is further configured to
  acquire the IP address of the target terminal from the target terminal.

4. The information processing apparatus according to claim 1, wherein the processing circuitry is further configured to
  acquire the MAC address of the base station from the target terminal.

5. The information processing apparatus according to claim 1, wherein the processing circuitry is further configured to
  acquire the position information of a plurality of target terminals estimated for each of the MAC addresses corresponding to the plurality of target terminals, from a position estimation device.

6. An information processing method comprising:
  acquiring a Media Access Control (MAC) address of a target terminal, wherein the MAC address of the target terminal is received from a controller communicably coupling one or more base stations and the information processing apparatus, wherein a base station from the one or more base stations receives the MAC address of the target terminal from the target terminal when the target terminal is initially connected to the base station, wherein the target terminal is identified based on a combination of an Internet Protocol (IP) address of the target terminal and a MAC address of the base station;
  acquiring a Universally Unique Identifier (UUID) from a target terminal in response to the target terminal connecting to the base station for a first time after installation of an application that uses position information of the target terminal, wherein the UUID is configured to identify the target terminal when the combination of the IP address of the target terminal and the MAC address of the base station received from the target terminal match the combination of the IP address of the target terminal and the MAC address of the base station received from the controller;
  storing the UUID and the MAC address of the target terminal, wherein the UUID is configured to uniquely identify the MAC address of the target terminal;
  determining position information of the target terminal based on a position of the base station; and
  securely providing the position information of the target terminal to the target terminal in response to receiving a position estimate request including only the UUID of the target terminal, wherein the MAC address of the target terminal is determined based on the UUID.

7. A non-transitory computer-readable storage medium that stores instructions, that when executed by a computer, causes the computer to perform operations that include:
  acquiring a Media Access Control (MAC) address of a target terminal, wherein the MAC address of the target terminal is received from a controller communicably coupling one or more base stations and the information processing apparatus, wherein a base station from the one or more base stations receives the MAC address of the target terminal from the target terminal when the target terminal is initially connected to the base station, wherein the target terminal is identified based on a combination of an Internet Protocol (IP) address of the target terminal and a MAC address of the base station;
  acquiring a Universally Unique Identifier (UUID) from a target terminal in response to the target terminal connecting to the base station for a first time after installation of an application that uses position information of the target terminal, wherein the UUID is configured to identify the target terminal when the combination of the IP address of the target terminal and the MAC address of the base station received from the target terminal match the combination of the IP address of the target terminal and the MAC address of the base station received from the controller;

storing the UUID and the MAC address of the target terminal, wherein the UUID is configured to uniquely identify the MAC address of the target terminal;

determining position information of the target terminal based on a position of the base station; and securely providing the position information of the target terminal to the target terminal in response to receiving a position estimate request including only the UUID of the target terminal, wherein the MAC address of the target terminal is determined based on the UUID.

8. A target terminal comprising:

processing circuitry configured to transmit a Media Access Control (MAC) address of the target terminal to an information processing apparatus, wherein the MAC address of the target terminal is transmitted first to a base station when the target terminal is initially connected to the base station, wherein the base station transmits the MAC address of the target terminal to a controller communicably coupling one or more base stations with the information processing apparatus, wherein the target terminal is identified based on a combination of an Internet Protocol address of the target terminal and a MAC address of the base station, transmit a Universally Unique Identifier (UUID) directly to the information processing apparatus in response to the target terminal connecting to the base station for a first time after installation of an application that uses position information of the target terminal, wherein the UUID is configured to identify the target terminal when the combination of the IP address of the target terminal and the MAC address of the base station transmitted directly to the information processing apparatus matches the combination of the IP address of the target terminal and the MAC address of the base station received from the controller;

transmit a position estimation request to the information processing apparatus including only the UUID of the target terminal; and securely acquire position information of the target terminal in response to the position estimation request including only the UUID of the target terminal to the information processing apparatus, wherein the MAC address of the target terminal is determined based on the UUID.

9. A communication method comprising:

transmitting a Media Access Control (MAC) address of a target terminal to an information processing apparatus, wherein the MAC address of the target terminal is transmitted first to a base station when the target terminal is initially connected to the base station, wherein the base station transmits the MAC address of the target terminal to a controller communicably coupling one or more base stations with the information processing apparatus, wherein the target terminal is identified based on a combination of an Internet Protocol address of the target terminal and a MAC address of the base station;

transmitting a Universally Unique Identifier (UUID) directly to the information processing apparatus in response to the target terminal connecting to the base station for a first time after installation of an application that uses position information of the target terminal, wherein the UUID is configured to identify the target terminal when the combination of the IP address of a target terminal and the MAC address of the base station transmitted directly to the information processing apparatus matches the combination of the IP address of the target terminal and the MAC address of the base station received from the controller;

transmitting a position estimation request to the information processing apparatus including only the UUID of the target terminal; and securely acquiring position information of the target terminal in response to the position estimation request including only the UUID of the target terminal to the information processing apparatus, wherein the MAC address of the target terminal is determined based on the UUID.

10. A non-transitory computer-readable storage medium that stores instructions, that when executed by a computer, causes the computer to perform operations that include:

transmitting a Media Access Control (MAC) address of a target terminal to an information processing apparatus, wherein the MAC address of the target terminal is transmitted first to a base station when the target terminal is initially connected to the base station, wherein the base station transmits the MAC address of the target terminal to a controller communicably coupling one or more base stations with the information processing apparatus, wherein the target terminal is identified based on a combination of an Internet Protocol address of the target terminal and a MAC address of the base station;

transmitting a Universally Unique Identifier (UUID) directly to the information processing apparatus in response to the target terminal connecting to the base station for a first time after installation of an application that uses position information of the target terminal, wherein the UUID is configured to identify the target terminal when the combination of the IP address of the target terminal and the MAC address of the base station transmitted directly to the information processing apparatus matches the combination of the IP address of the target terminal and the MAC address of the base station received from the controller;

transmitting a position estimation request to the information processing apparatus including only the UUID of the target terminal; and securely acquiring position information of the target terminal in response to the position estimation request including only the UUID of the target terminal to the information processing apparatus, wherein the MAC address of the target terminal is determined based on the UUID.

* * * * *